US011002215B2

(12) United States Patent
Takemoto et al.

(10) Patent No.: US 11,002,215 B2
(45) Date of Patent: May 11, 2021

(54) ENGINE CONTROL DEVICE, ENGINE CONTROL METHOD, AND ENGINE SYSTEM

(71) Applicant: Mazda Motor Corporation, Hiroshima (JP)

(72) Inventors: Kazuhiro Takemoto, Hiroshima (JP); Michio Ito, Hatsukaichi (JP); Masanari Sueoka, Hiroshima (JP); Kazuhiro Nishimura, Higashihiroshima (JP); Kouji Hadama, Hiroshima (JP); Masataka Sumita, Aki-gun (JP); Masami Nishida, Hiroshima (JP)

(73) Assignee: Mazda Motor Corporation, Hiroshima (JP)

( * ) Notice: Subject to any disclaimer, the term of this patent is extended or adjusted under 35 U.S.C. 154(b) by 0 days.

(21) Appl. No.: 16/811,142

(22) Filed: Mar. 6, 2020

(65) Prior Publication Data

US 2020/0370500 A1 Nov. 26, 2020

(30) Foreign Application Priority Data

May 20, 2019 (JP) .............................. JP2019-094273

(51) Int. Cl.
*F02D 41/40* (2006.01)
*F02B 77/04* (2006.01)
(Continued)

(52) U.S. Cl.
CPC ............ *F02D 41/401* (2013.01); *F02B 77/04* (2013.01); *F02F 3/28* (2013.01); *F02M 59/20* (2013.01);
(Continued)

(58) Field of Classification Search
CPC .. F02D 41/40; F02D 41/401; F02D 2041/389; F02D 2200/0602; F02M 59/20; F02F 3/28; F02B 77/04
See application file for complete search history.

(56) References Cited

U.S. PATENT DOCUMENTS

| 2004/0260449 | A1  | 12/2004 | Heinstein et al. |
| 2005/0166896 | A1  | 8/2005  | Sadakane et al. |
| 2008/0147298 | A1* | 6/2008  | Suda ..................... F02P 5/1506 |
|              |     |         | 701/103 |

FOREIGN PATENT DOCUMENTS

| DE | 10316391 A1 | 10/2004 |
| DE | 102015215361 A1 | 3/2016 |

(Continued)

OTHER PUBLICATIONS

European Patent Office, Extended European Search Report Issued in Application No. 20161086.2 dated Sep. 29, 2020, Germany, 9 pages.

*Primary Examiner* — Hieu T Vo
(74) *Attorney, Agent, or Firm* — Alleman Hall Creasman & Tuttle LLP

(57) ABSTRACT

A controller for controlling a fuel injection valve and a fuel pressure adjustment mechanism integrates a deposition amount of deposits per unit time, and estimates a deposition amount of deposits on an injection hole of the fuel injection valve. The controller causes the fuel pressure adjustment mechanism to increase a fuel pressure, when the estimated deposition amount exceeds a predetermined value, and corrects the unit deposition amount acquired by the deposition amount estimation according to the set fuel injection timing of the fuel injection valve. The controller corrects such that as compared with the unit deposition amount when the fuel injection timing is set to a first timing away from a top dead center of the piston by a first period, the unit deposition (Continued)

amount decreases when the fuel injection timing is set to a second timing away by a second period longer than the first period.

7 Claims, 16 Drawing Sheets

(51) Int. Cl.
    *F02F 3/28*     (2006.01)
    *F02M 59/20*     (2006.01)
    *F02D 41/38*     (2006.01)

(52) U.S. Cl.
    CPC ............... *F02D 2041/389* (2013.01); *F02D 2200/0602* (2013.01)

(56) References Cited

FOREIGN PATENT DOCUMENTS

| EP | 1344920 A2 | 9/2003 |
| EP | 1555417 A2 | 7/2005 |
| JP | 2003227375 A | 8/2003 |
| JP | 2018062923 A | 4/2018 |

\* cited by examiner

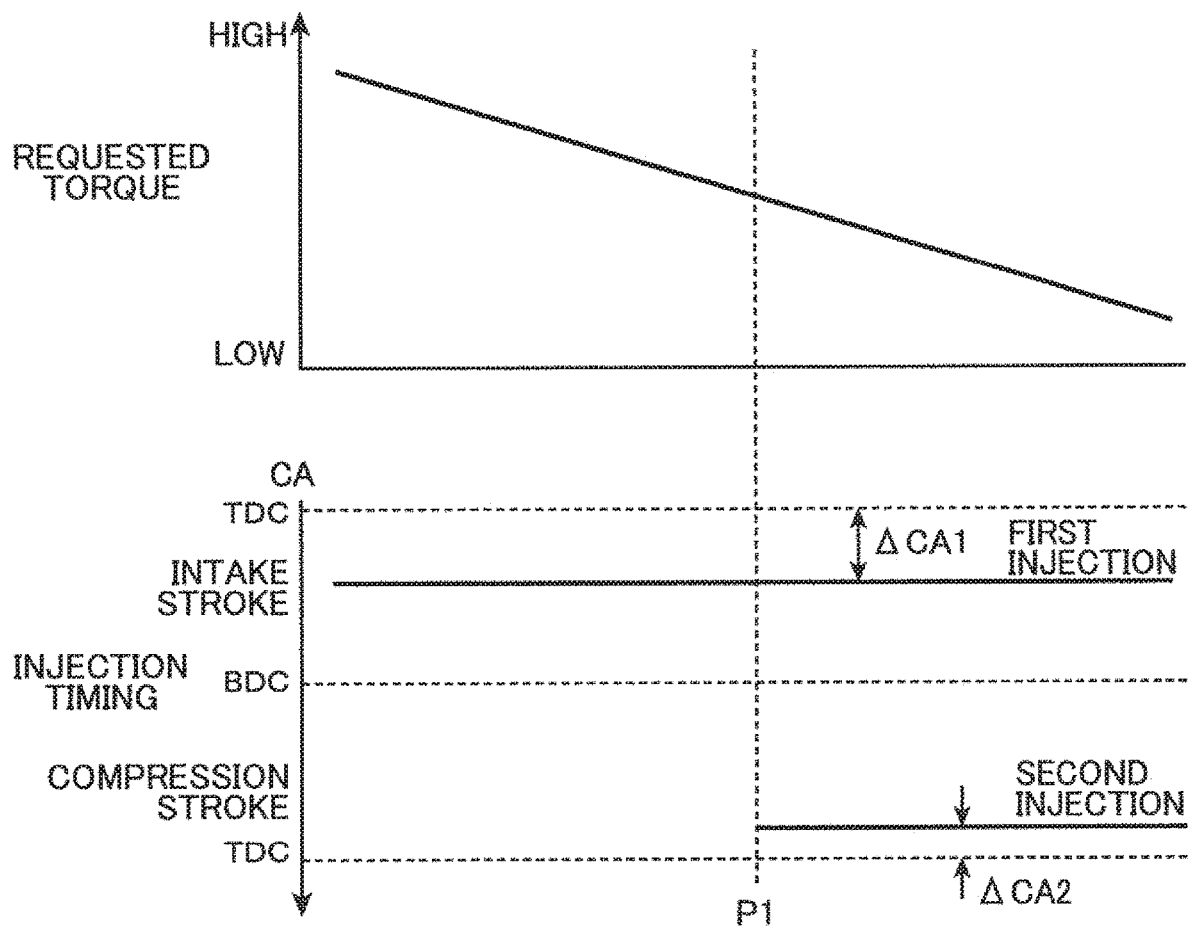

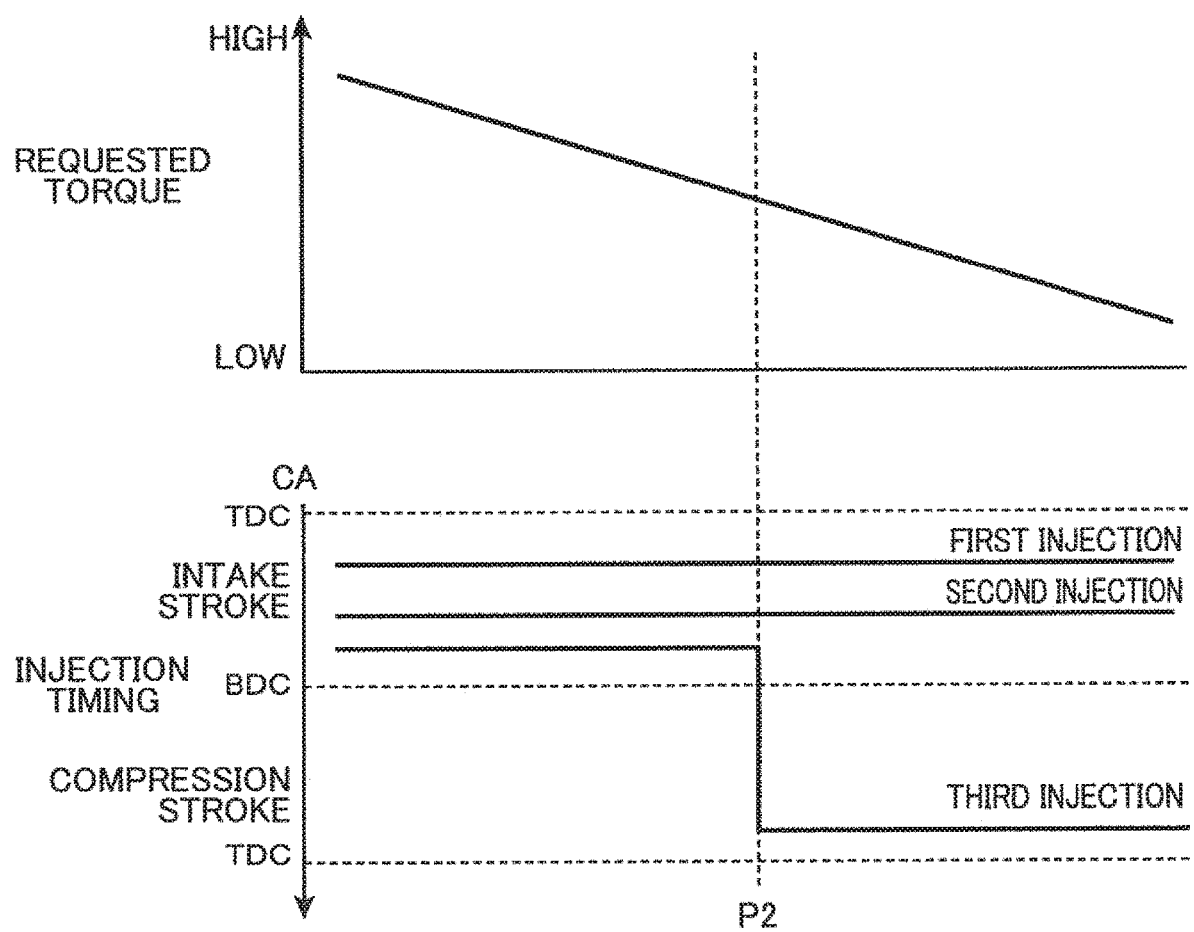

FIG.8

(SPCCI_λ=1, S1) BASIC FUEL PRESSURE MAP

| LOAD/ROTATION SPEED | 500 | 750 | 1000 | 1250 | 1500 | 1750 | 2000 | 2250 | 2500 | 2750 | 3000 | 3250 | 3500 | 3750 | 4000 | 4500 | 5000 | 5500 | 6000 | 6500 |
|---|---|---|---|---|---|---|---|---|---|---|---|---|---|---|---|---|---|---|---|---|
| 0.125 | 40 | 40 | 40 | 40 | 40 | 40 | 40 | 40 | 40 | 40 | 40 | 60 | 60 | 60 | 60 | 60 | 60 | 60 | 60 | 60 |
| 0.15 | 40 | 40 | 40 | 40 | 40 | 40 | 40 | 40 | 40 | 40 | 40 | 60 | 60 | 60 | 60 | 60 | 60 | 60 | 60 | 60 |
| 0.2 | 40 | 40 | 40 | 40 | 40 | 40 | 40 | 40 | 40 | 40 | 40 | 60 | 60 | 60 | 60 | 60 | 60 | 60 | 60 | 60 |
| 0.25 | 40 | 40 | 40 | 40 | 40 | 40 | 40 | 40 | 40 | 40 | 40 | 60 | 60 | 60 | 60 | 60 | 60 | 60 | 60 | 60 |
| 0.3 | 40 | 40 | 40 | 40 | 40 | 40 | 40 | 40 | 40 | 40 | 40 | 60 | 60 | 60 | 60 | 60 | 60 | 60 | 60 | 60 |
| 0.35 | 40 | 40 | 40 | 40 | 40 | 40 | 40 | 40 | 40 | 40 | 60 | 60 | 60 | 60 | 60 | 60 | 60 | 60 | 60 | 60 |
| 0.4 | 40 | 40 | 40 | 40 | 40 | 40 | 40 | 40 | 40 | 40 | 60 | 60 | 60 | 60 | 60 | 60 | 60 | 60 | 60 | 60 |
| 0.45 | 40 | 40 | 40 | 60 | 60 | 60 | 60 | 60 | 60 | 60 | 60 | 60 | 60 | 60 | 60 | 60 | 60 | 60 | 60 | 60 |
| 0.5 | 30 | 30 | 60 | 60 | 60 | 60 | 60 | 60 | 60 | 60 | 40 | 40 | 40 | 40 | 40 | 40 | 40 | 40 | 40 | 40 |
| 0.55 | 30 | 30 | 60 | 60 | 60 | 60 | 60 | 60 | 60 | 60 | 40 | 40 | 40 | 40 | 40 | 40 | 40 | 40 | 40 | 40 |
| 0.6 | 30 | 30 | 30 | 30 | 30 | 60 | 60 | 60 | 60 | 30 | 40 | 40 | 40 | 40 | 40 | 40 | 40 | 40 | 40 | 40 |
| 0.65 | 30 | 30 | 30 | 30 | 30 | 30 | 30 | 30 | 30 | 30 | 40 | 40 | 40 | 40 | 40 | 40 | 40 | 40 | 40 | 40 |
| 0.7 | 30 | 30 | 30 | 30 | 30 | 30 | 30 | 30 | 30 | 30 | 40 | 40 | 40 | 40 | 40 | 40 | 40 | 40 | 40 | 40 |
| 0.8 | 30 | 30 | 30 | 30 | 30 | 30 | 30 | 30 | 30 | 30 | 40 | 40 | 40 | 40 | 40 | 40 | 40 | 40 | 40 | 40 |
| 0.9 | 30 | 30 | 30 | 30 | 30 | 30 | 30 | 30 | 30 | 30 | 40 | 40 | 40 | 40 | 40 | 40 | 40 | 40 | 40 | 40 |
| 1 | 30 | 30 | 30 | 30 | 30 | 30 | 30 | 30 | 30 | 30 | 40 | 40 | 40 | 40 | 40 | 40 | 40 | 40 | 40 | 40 |
| 1.1 | 30 | 30 | 30 | 30 | 30 | 30 | 30 | 30 | 30 | 30 | 40 | 40 | 40 | 40 | 40 | 40 | 40 | 40 | 40 | 40 |
| 1.2 | 30 | 30 | 30 | 30 | 30 | 30 | 30 | 30 | 30 | 30 | 40 | 40 | 40 | 40 | 40 | 40 | 40 | 40 | 40 | 40 |
| 1.3 | 30 | 30 | 30 | 30 | 30 | 30 | 30 | 30 | 30 | 30 | 40 | 40 | 40 | 40 | 40 | 40 | 40 | 40 | 40 | 40 |
| 1.4 | 30 | 30 | 30 | 30 | 30 | 30 | 30 | 30 | 30 | 30 | 40 | 40 | 40 | 40 | 40 | 40 | 40 | 40 | 40 | 40 |

FIG.9

[SPCCI_λ>1] BASIC FUEL PRESSURE MAP

| INJECTION AMOUNT /ROTATION SPEED | 750 | 1000 | 1250 | 1500 | 1750 | 2000 | 2250 | 2500 | 2750 | 3000 |
|---|---|---|---|---|---|---|---|---|---|---|
| 4.5 | 40 | 40 | 40 | 40 | 40 | 40 | 40 | 40 | 40 | 40 |
| 6.5 | 40 | 40 | 40 | 40 | 40 | 40 | 40 | 40 | 40 | 40 |
| 8.5 | 40 | 40 | 40 | 40 | 40 | 40 | 40 | 40 | 40 | 40 |
| 10.5 | 40 | 40 | 40 | 40 | 40 | 40 | 40 | 40 | 40 | 40 |
| 12.5 | 40 | 40 | 40 | 40 | 40 | 40 | 40 | 40 | 40 | 40 |
| 14.5 | 40 | 40 | 40 | 40 | 40 | 40 | 40 | 40 | 40 | 40 |
| 15.5 | 40 | 40 | 40 | 40 | 40 | 40 | 40 | 40 | 40 | 40 |
| 16.5 | 40 | 40 | 40 | 40 | 40 | 40 | 40 | 40 | 40 | 40 |
| 18.5 | 40 | 40 | 40 | 40 | 40 | 40 | 40 | 40 | 40 | 40 |
| 20.5 | 40 | 40 | 40 | 40 | 40 | 40 | 40 | 40 | 40 | 40 |

FIG.10

(SPCCI_λ=1, Si) FUEL PRESSURE MAP FOR DEPOSITION REMOVAL

| LOAD/ROTATION SPEED | 500 | 750 | 1000 | 1250 | 1500 | 1750 | 2000 | 2250 | 2500 | 2750 | 3000 | 3250 | 3500 | 3750 | 4000 | 4500 | 5000 | 5500 | 6000 | 6500 |
|---|---|---|---|---|---|---|---|---|---|---|---|---|---|---|---|---|---|---|---|---|
| 0.125 | 60 | 60 | 60 | 60 | 60 | 60 | 60 | 60 | 60 | 60 | 60 | 60 | 60 | 60 | 60 | 60 | 60 | 60 | 60 | 60 |
| 0.15 | 60 | 60 | 60 | 60 | 60 | 60 | 60 | 60 | 60 | 60 | 60 | 60 | 60 | 60 | 60 | 60 | 60 | 60 | 60 | 60 |
| 0.2 | 60 | 60 | 60 | 60 | 60 | 60 | 60 | 60 | 60 | 60 | 60 | 60 | 60 | 60 | 60 | 60 | 60 | 60 | 60 | 60 |
| 0.25 | 60 | 60 | 60 | 60 | 60 | 60 | 60 | 60 | 60 | 60 | 60 | 60 | 60 | 60 | 60 | 60 | 60 | 60 | 60 | 60 |
| 0.3 | 60 | 60 | 60 | 60 | 60 | 60 | 60 | 60 | 60 | 60 | 60 | 60 | 60 | 60 | 60 | 60 | 60 | 60 | 60 | 60 |
| 0.35 | 60 | 60 | 60 | 60 | 60 | 60 | 60 | 60 | 60 | 60 | 60 | 60 | 60 | 60 | 60 | 60 | 60 | 60 | 60 | 60 |
| 0.4 | 60 | 60 | 60 | 60 | 60 | 60 | 60 | 60 | 60 | 60 | 60 | 60 | 60 | 60 | 60 | 60 | 60 | 60 | 60 | 60 |
| 0.45 | 60 | 60 | 60 | 60 | 60 | 60 | 60 | 60 | 60 | 60 | 60 | 60 | 60 | 60 | 60 | 60 | 60 | 60 | 60 | 60 |
| 0.5 | 30 | 30 | 60 | 60 | 60 | 60 | 60 | 60 | 60 | 60 | 60 | 60 | 60 | 60 | 60 | 60 | 60 | 60 | 60 | 60 |
| 0.55 | 30 | 30 | 60 | 60 | 60 | 60 | 60 | 60 | 60 | 60 | 60 | 60 | 60 | 60 | 60 | 60 | 60 | 60 | 60 | 60 |
| 0.6 | 30 | 30 | 30 | 60 | 60 | 60 | 60 | 60 | 60 | 60 | 60 | 60 | 60 | 60 | 60 | 60 | 60 | 60 | 60 | 60 |
| 0.65 | 30 | 30 | 30 | 30 | 60 | 60 | 60 | 60 | 60 | 60 | 60 | 60 | 60 | 60 | 60 | 60 | 60 | 60 | 60 | 60 |
| 0.7 | 30 | 30 | 30 | 30 | 30 | 60 | 60 | 60 | 60 | 60 | 60 | 60 | 60 | 60 | 60 | 60 | 60 | 60 | 60 | 60 |
| 0.8 | 30 | 30 | 30 | 30 | 30 | 30 | 30 | 30 | 30 | 30 | 40 | 40 | 40 | 40 | 40 | 40 | 40 | 40 | 40 | 40 |
| 0.9 | 30 | 30 | 30 | 30 | 30 | 30 | 30 | 30 | 30 | 30 | 40 | 40 | 40 | 40 | 40 | 40 | 40 | 40 | 40 | 40 |
| 1 | 30 | 30 | 30 | 30 | 30 | 30 | 30 | 30 | 30 | 30 | 40 | 40 | 40 | 40 | 40 | 40 | 40 | 40 | 40 | 40 |
| 1.1 | 30 | 30 | 30 | 30 | 30 | 30 | 30 | 30 | 30 | 30 | 40 | 40 | 40 | 40 | 40 | 40 | 40 | 40 | 40 | 40 |
| 1.2 | 30 | 30 | 30 | 30 | 30 | 30 | 30 | 30 | 30 | 30 | 40 | 40 | 40 | 40 | 40 | 40 | 40 | 40 | 40 | 40 |
| 1.3 | 30 | 30 | 30 | 30 | 30 | 30 | 30 | 30 | 30 | 30 | 40 | 40 | 40 | 40 | 40 | 40 | 40 | 40 | 40 | 40 |
| 1.4 | 30 | 30 | 30 | 30 | 30 | 30 | 30 | 30 | 30 | 30 | 40 | 40 | 40 | 40 | 40 | 40 | 40 | 40 | 40 | 40 |

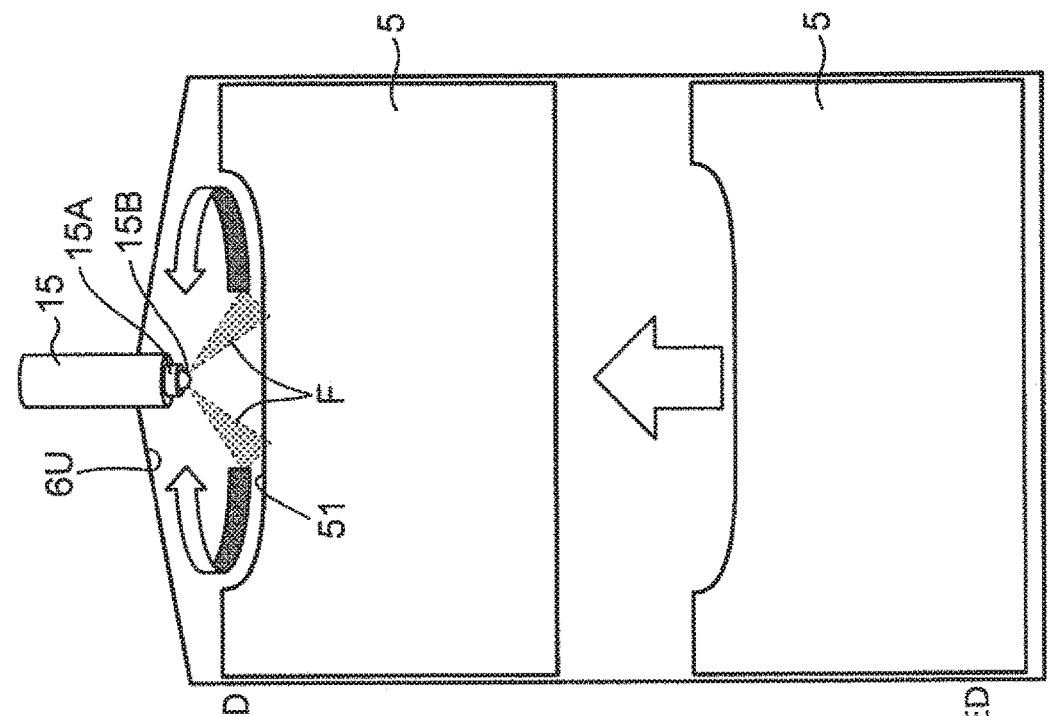
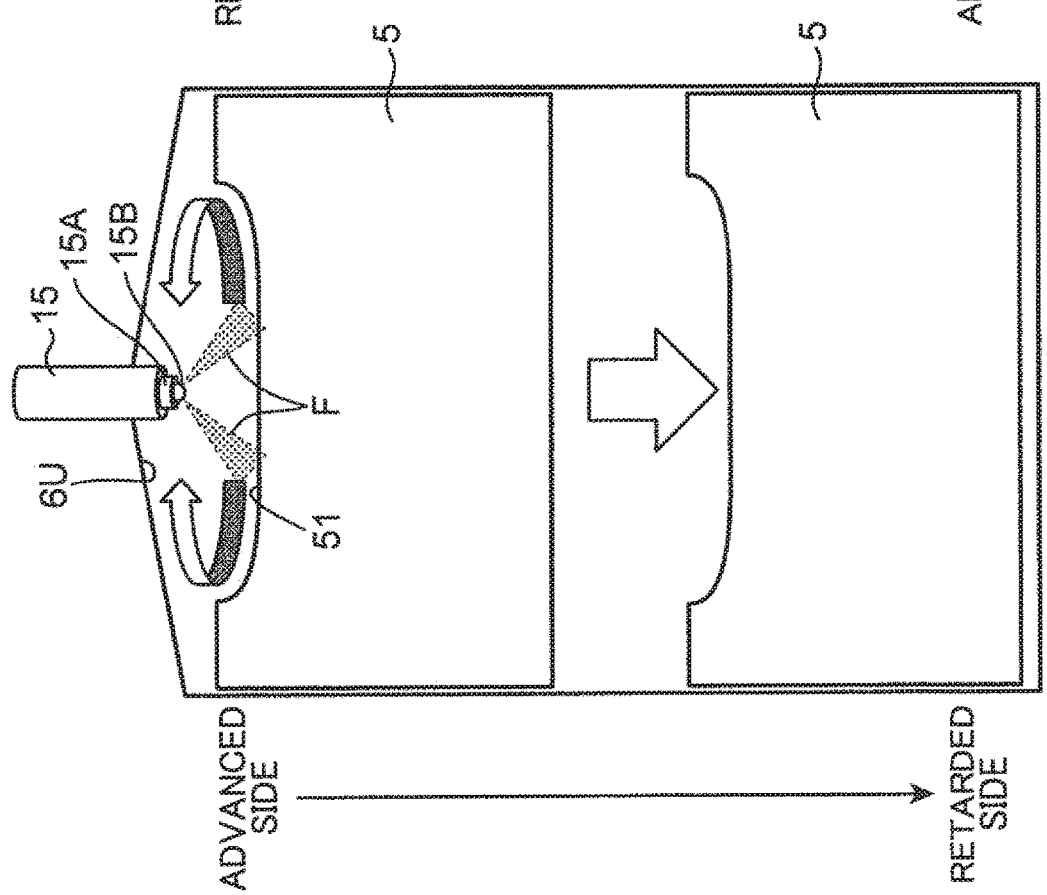

FIG.13A

SPCCI_$\lambda$ = 1 AND SI

| LOAD/ROTATION SPEED | 0 | 1000 | 1500 | 2000 | 3000 |
|---:|---:|---:|---:|---:|---:|
| 0.1 | 0 | 1.0 | 1.0 | 1.0 | 1.0 |
| 0.15 | 0 | 1.0 | 1.0 | 1.0 | 1.0 |
| 0.2 | 0 | 1.0 | 1.0 | 1.0 | 1.0 |
| 0.25 | 0 | 1.0 | 1.0 | 1.0 | 1.0 |
| 0.3 | 0 | 1.0 | 1.0 | 1.0 | 1.0 |
| 0.35 | 0 | 1.0 | 1.0 | 1.0 | 1.0 |
| 0.4 | 0 | 1.0 | 1.0 | 1.0 | 1.0 |
| 0.5 | 0 | 1.0 | 1.0 | 1.0 | 1.0 |
| 0.6 | 0 | 0.8 | 0.8 | 0.8 | 1.0 |
| 0.7 | 0 | 0.8 | 0.8 | 0.8 | 1.0 |
| 0.8 | 0 | 0.8 | 0.8 | 0.8 | 0.8 |
| 0.9 | 0 | 0.8 | 0.8 | 0.8 | 0.8 |
| 1 | 0 | 0.8 | 0.8 | 0.8 | 0.8 |
| 1.1 | 0 | 0.8 | 0.8 | 0.8 | 0.8 |

FIG.13B

SPCCI_$\lambda$ > 1

| INJECTION AMOUNT/ROTATION SPEED | 0 | 1000 | 1500 | 2000 | 2500 |
|---:|---:|---:|---:|---:|---:|
| 2 | 0 | 1.0 | 1.0 | 1.0 | 1.0 |
| 4 | 0 | 1.0 | 1.0 | 1.0 | 1.0 |
| 6 | 0 | 1.0 | 1.0 | 1.0 | 1.0 |
| 8 | 0 | 1.0 | 1.0 | 1.0 | 1.0 |
| 10 | 0 | 1.0 | 1.0 | 0.9 | 0.9 |
| 15 | 0 | 1.0 | 1.0 | 0.9 | 0.9 |
| 20 | 0 | 1.0 | 1.0 | 0.9 | 0.9 |

FIG.15A

SPCCI_$\lambda = 1$

| LOAD/ROTATION SPEED | 1000 | 1500 | 2000 | 3000 | 4000 | 5000 | 6000 |
|---|---|---|---|---|---|---|---|
| 0.1 | 0.0 | 0.0 | 0.0 | 0.0 | 0.0 | 0.0 | 0.0 |
| 0.15 | 0.0 | 0.0 | 0.0 | 0.0 | 0.0 | 0.0 | 0.0 |
| 0.2 | 0.0 | 0.0 | 0.0 | 0.0 | 0.0 | 0.0 | 0.0 |
| 0.25 | 0.0 | 0.0 | 0.0 | 0.0 | 0.0 | 0.0 | 0.0 |
| 0.3 | 0.0 | 0.0 | 0.0 | 0.0 | 0.0 | 0.0 | 0.0 |
| 0.35 | 0.0 | 0.0 | 0.0 | 0.0 | 0.0 | 0.0 | 0.0 |
| 0.4 | 0.0 | 0.0 | 0.0 | 0.0 | 0.0 | 0.0 | 0.0 |
| 0.5 | 0.0 | 0.0 | 0.0 | 0.0 | 0.0 | 0.0 | 0.0 |
| 0.6 | 0.0 | 0.0 | 0.0 | 0.0 | 0.0 | 0.0 | 0.0 |
| 0.7 | −0.3 | −0.3 | −0.3 | −0.3 | −0.3 | −0.3 | −0.3 |
| 0.8 | −0.3 | −0.3 | −0.3 | −0.3 | −0.3 | −0.3 | −0.3 |
| 0.9 | −0.3 | −0.3 | −0.3 | −0.3 | −0.3 | −0.3 | −0.3 |
| 1 | −0.5 | −0.5 | −0.5 | −0.5 | −0.5 | −0.5 | −0.5 |
| 1.1 | −0.5 | −0.5 | −0.5 | −0.5 | −0.5 | −0.5 | −0.5 |

FIG.15B

SPCCI_$\lambda > 1$

| INJECTION AMOUNT /ROTATION SPEED | 1000 | 1500 | 2000 | 2500 |
|---|---|---|---|---|
| 2 | 0.0 | 0.0 | 0.0 | 0.0 |
| 4 | 0.0 | 0.0 | 0.0 | 0.0 |
| 6 | 0.0 | 0.0 | 0.0 | 0.0 |
| 8 | 0.0 | 0.0 | 0.0 | 0.0 |
| 10 | 0.0 | 0.0 | 0.0 | 0.0 |
| 15 | −0.1 | −0.1 | −0.1 | −0.1 |
| 20 | −0.1 | −0.1 | −0.1 | −0.1 |

ENGINE CONTROL DEVICE, ENGINE CONTROL METHOD, AND ENGINE SYSTEM

CROSS-REFERENCE TO RELATED APPLICATION

This application is based on Japanese Patent application No. 2019-094273 filed in Japan Patent Office on May 20, 2019, the contents of which are hereby incorporated by reference.

TECHNICAL FIELD

The present invention relates to a control device and a control method for an engine including a fuel injection valve for directly injecting fuel toward a cavity of a piston, and an engine system to which the control device and the control method are applied.

BACKGROUND

In a direct-injection engine, a fuel injection valve is disposed in such a way that an injection hole is exposed in a ceiling surface of a combustion chamber, for example. In this case, deposits (carbon) may adhere to the injection hole, and fuel injection performance of the injection hole may be lowered. One of the factors of generation of the deposits is that injected fuel adheres to the vicinity of the injection hole, and the fuel is solidified by combustion within the combustion chamber.

Japanese Unexamined Patent Application Publication No. 2018-62923 discloses a technique of performing cleaning control in which a fuel pressure of a fuel injection valve is increased in order to remove deposits adhered to the vicinity of an injection hole. In order to timely perform the cleaning control, it is desired to accurately determine a deposition amount of deposits. The above publication discloses a method of predicting a deposition amount of deposits, based on an integration time of a low speed operation.

However, it is revealed that it is not possible to accurately acquire a deposition amount of deposits, based on an integration time of a low speed operation. In particular, when a fuel injection valve of a center injection type in which fuel is directly injected toward a cavity of a piston is employed, flowing back of fuel injected from an injection hole from the cavity and the like may occur. The inventors of the present application have found that the flowing-back fuel adheres to the vicinity of the injection hole, and the adhesion becomes a factor of deposition of deposits. However, since the conventional technique does not consider the adhesion of flowing-back fuel, there is an issue that it is not possible to accurately predict a deposition amount of deposits.

SUMMARY

An object of the present invention is to provide an engine control device and an engine control method capable of accurately predicting a deposition amount of deposits on an injection hole of a fuel injection valve, and timely cleaning deposits; and an engine system to which the engine control device and the engine control method are applied.

An engine control device according to one aspect of the present invention is a control device for an engine provided with a fuel injection valve disposed within a combustion chamber, a part of which is defined by a piston including a cavity in a crown surface thereof, and configured to directly inject fuel toward the cavity. The control device includes: a fuel pressure adjustment mechanism for adjusting a fuel pressure of fuel to be supplied to the fuel injection valve; and a controller for controlling the fuel injection valve and the fuel pressure adjustment mechanism, and constituted of a circuitry. The controller is configured to set a fuel injection timing at which fuel is injected from the fuel injection valve, based on an operating condition of the engine, output a control signal to the fuel injection valve in such a way as to drive the fuel injection valve, based on the set fuel injection timing, perform processing of integrating a deposition amount of deposits per unit time, based on an operating condition of the engine, and estimating a deposition amount of deposits on an injection hole of the fuel injection valve, output a control signal to the fuel pressure adjustment mechanism in such a way as to increase the fuel pressure, when the estimated deposition amount of deposits exceeds a predetermined value, correct the unit deposition amount acquired by estimation of the deposition amount of deposits according to the set fuel injection timing of the fuel injection valve, and correct in such a way that as compared with the unit deposition amount when the fuel injection timing is set to a first timing away from a top dead center of the piston by a first period, the unit deposition amount decreases when the fuel injection timing is set to a second timing away from the top dead center of the piston by a second period longer than the first period.

An engine system according to another aspect of the present invention includes: an engine body including a combustion chamber, a part of which is defined by a piston including a cavity in a crown surface thereof, and a fuel injection valve disposed within the combustion chamber and configured to directly inject fuel toward the cavity; and the above-described control device. A head portion of the fuel injection valve in which the injection hole is formed is disposed on a ceiling surface of the combustion chamber in such a way as to face the cavity in a vicinity of a radial center of the combustion chamber.

An engine control method according to yet another aspect of the present invention is a control method for an engine provided with a combustion chamber, a part of which is defined by a piston including a cavity in a crown surface thereof, a fuel injection valve for directly injecting fuel toward the cavity, and a fuel pressure adjustment mechanism for adjusting a fuel pressure of fuel to be supplied to the fuel injection valve. The control method includes: setting a fuel injection timing at which fuel is injected from the fuel injection valve, based on an operating condition of the engine; driving the fuel injection valve, based on the set fuel injection timing; integrating a deposition amount of deposits per unit time, based on an operating condition of the engine, and estimating a deposition amount of deposits on an injection hole of the fuel injection valve; causing the fuel pressure adjustment mechanism to increase the fuel pressure, when the estimated deposition amount of deposits exceeds a predetermined value; correcting the unit deposition amount acquired by estimation of the deposition amount of deposits according to the set fuel injection timing of the fuel injection valve; and correcting in such a way that as compared with the unit deposition amount when the fuel injection timing is set to a first timing away from a top dead center of the piston by a first period, the unit deposition amount decreases when the fuel injection timing is set to a second timing away from the top dead center of the piston by a second period longer than the first period.

BRIEF DESCRIPTION OF DRAWINGS

FIG. 6 is a graph illustrating a relationship between requested torque and a fuel injection timing, when SPCCI_λ=1 combustion is performed.

FIG. 7 is a graph illustrating a relationship between requested torque and a fuel injection timing, when SPCCI_λ>1 combustion is performed.

FIG. 8 is one example of a basic fuel pressure map for use in setting a fuel pressure of an injector, when SI combustion and SPCCI_λ=1 combustion are performed.

FIG. 9 is one example of a basic fuel pressure map for use in setting a fuel pressure of the injector, when SPCCI_λ>1 combustion is performed.

FIG. 10 is one example of a deposition removal map for use in performing a cleaning mode of the injector, when SI combustion and SPCCI_λ=1 combustion are performed.

FIGS. 12A and 12B are schematic diagrams respectively illustrating how injected fuel flows back in an intake stroke and in a compression stroke.

FIGS. 13A and 13B are one example of maps on a rotational load coefficient for use in performing integration of a deposition amount of deposits.

FIGS. 15A and 15B are one example of maps on an injection amount offset coefficient for use in performing integration of a deposition amount of deposits.

DETAILED DESCRIPTION

[Overall Configuration of Engine]

Figure 1:
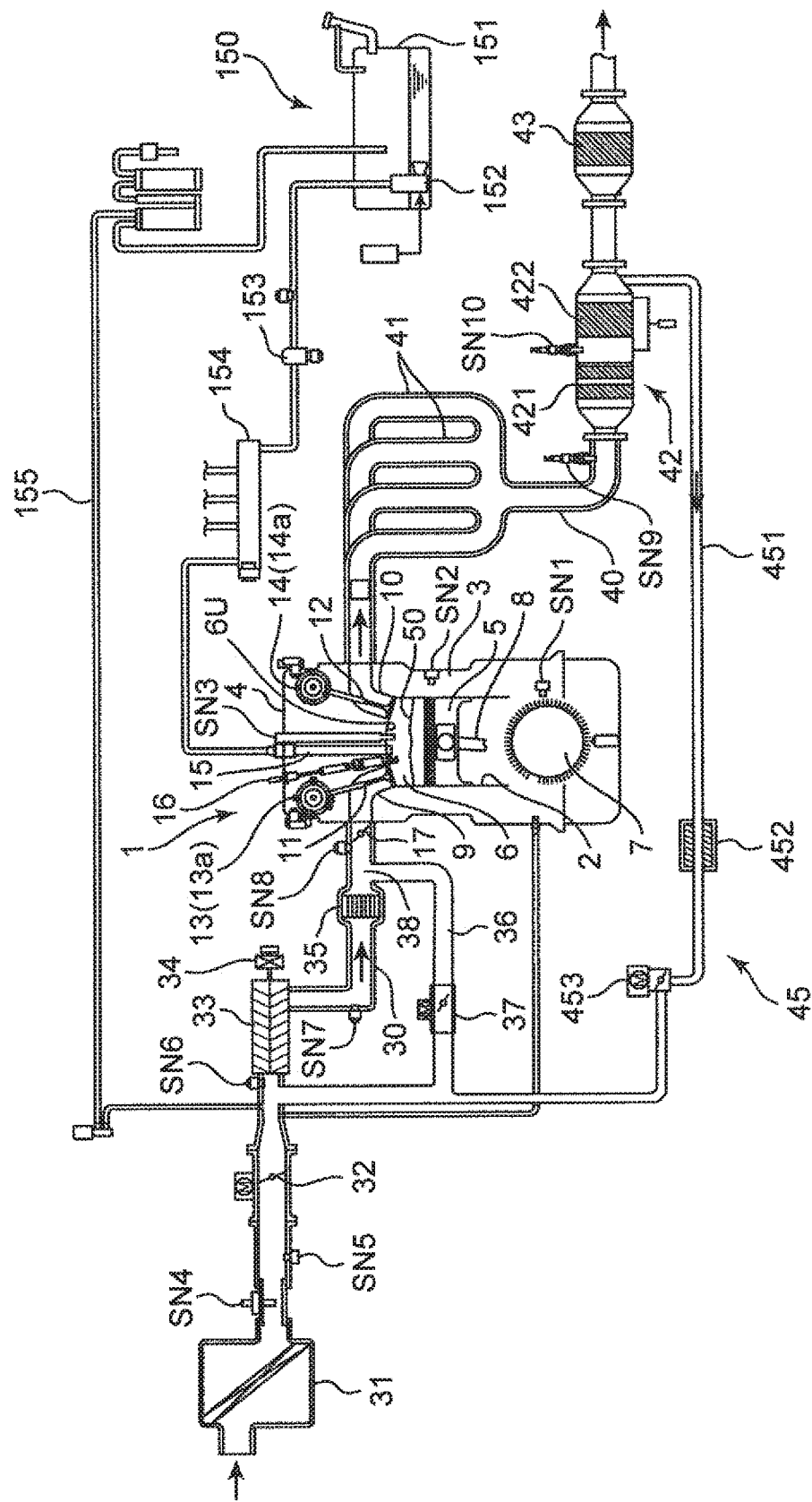
FIG. 1 is a diagram illustrating an overall configuration of an engine system to which an engine control device according to the present invention is applied.

In the following, an embodiment according to the present invention is described in detail with reference to the drawings. First, an overall configuration of an engine system to which an engine control device and an engine control method according to the present invention are applied is described with reference to a system diagram illustrated in FIG. 1. An engine illustrated in FIG. 1 is a 4-cycle gasoline direct-injection engine to be mounted in a vehicle, as a power source for driving the vehicle. The engine includes an engine body 1, an intake passage 30 through which intake air to be introduced to the engine body 1 flows, an exhaust passage 40 through which exhaust gas to be discharged from the engine body 1 flows, an external EGR device 45 for allowing a part of exhaust gas flowing through the exhaust passage 40 to return to the intake passage 30, and a fuel supply system 150 for supplying, to the engine body 1, fuel containing gasoline as a main component.

Figure 2:
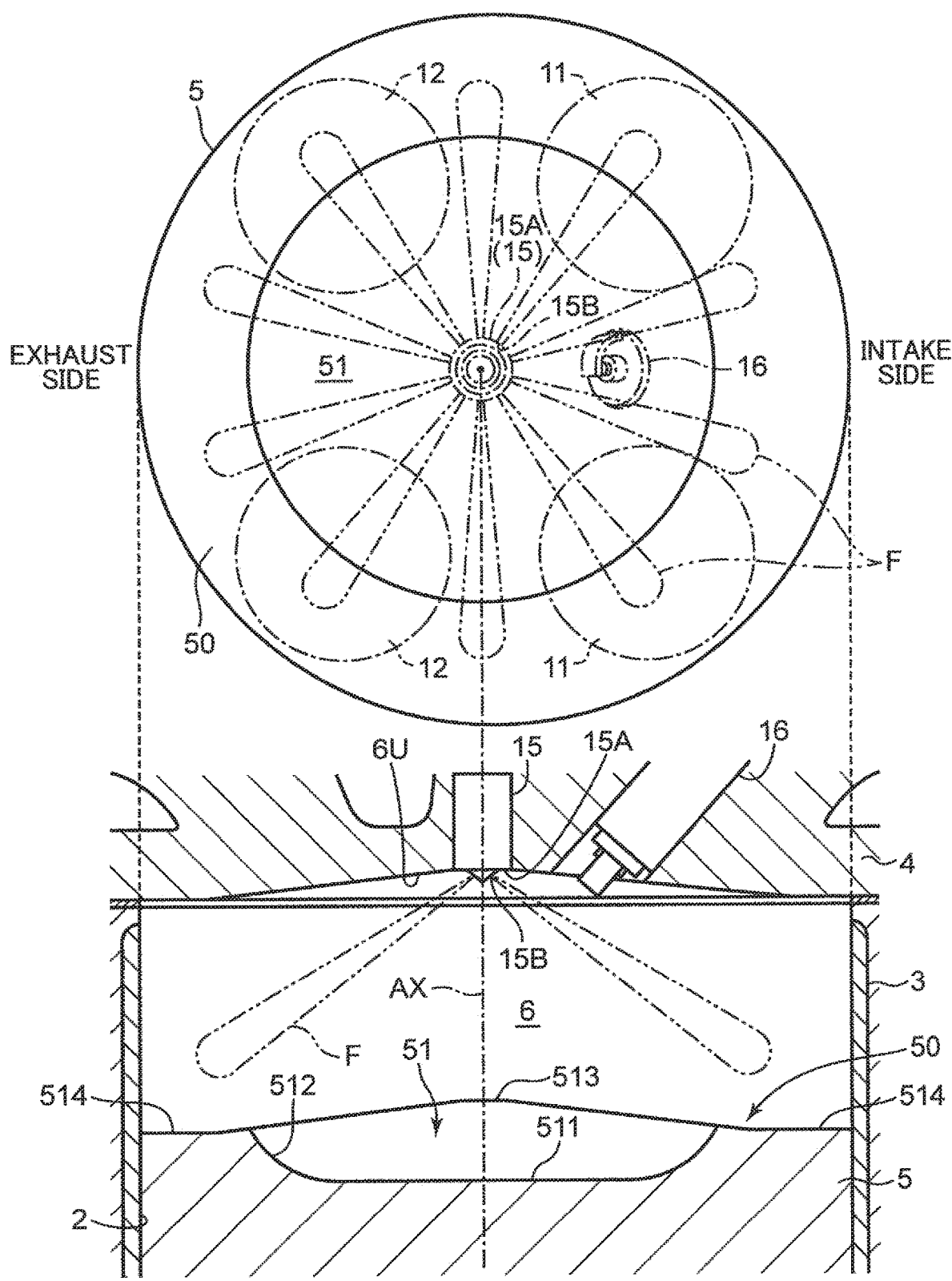
FIG. 2 is a diagram illustrating a cross-sectional view of an engine body, and a plan view of a piston in combination.
Figure 3:
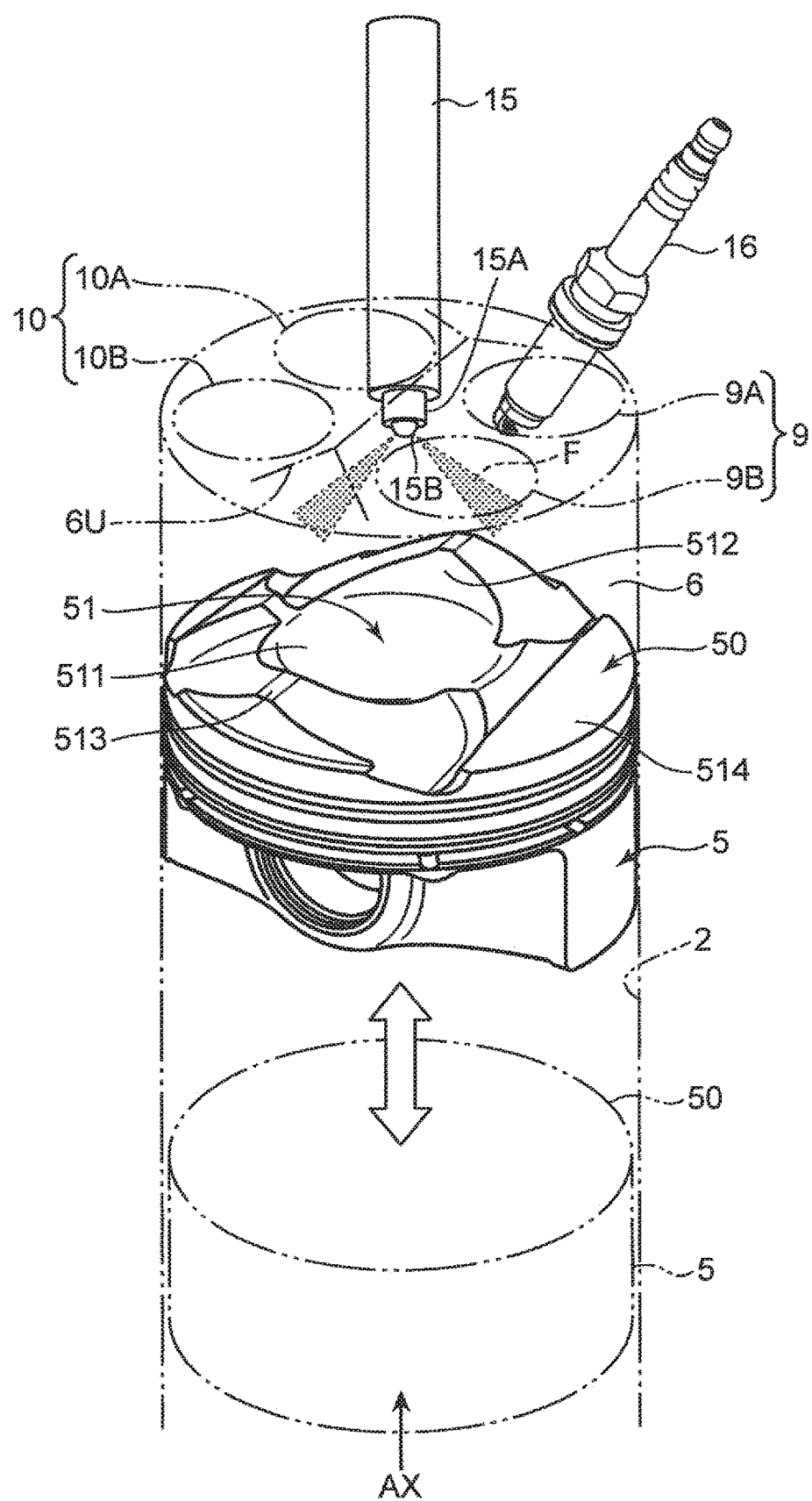
FIG. 3 is a schematic perspective view of one cylinder included in the engine.

The engine body 1 includes a cylinder block 3 in which cylinders 2 are internally formed, a cylinder head 4 mounted on an upper surface of the cylinder block 3 in such a way as to close the cylinders 2 from above, and a piston 5 accommodated within each of the cylinders 2. The engine body 1 is typically of a multi-cylinder type in which a plurality of (e.g. four) cylinders are provided. For simplification, FIG. 1 illustrates only one cylinder 2. FIG. 2 illustrates a cross-sectional view of the engine body 1, and a plan view of the piston 5 in combination. Further, FIG. 3 is a schematic perspective view of one cylinder 2. The piston 5 has an outer diameter according to a bore diameter of the cylinder 2, and is accommodated within the cylinder 2 in such a way as to be reciprocally and slidably movable at a predetermined stroke. A crankshaft 7 being an output shaft of the engine body 1 is provided below the piston 5. The crankshaft 7 is connected to the piston 5 via a connecting rod 8, and is driven to rotate around an axis thereof, as the piston 5 reciprocally moves.

A combustion chamber 6 is defined above the piston 5. The fuel is supplied to the combustion chamber 6 by injection from an injector 15 to be described later. The supplied fuel is mixed with air within the combustion chamber 6 for combustion, and the piston 5 pushed downwardly by an expansion force by the combustion reciprocally moves up and down. A combustion chamber wall surface for defining the combustion chamber 6 is constituted of an inner wall surface of the cylinder 2, a crown surface 50 being an upper surface of the piston 5, and a combustion chamber ceiling surface 6U (including each of valve surfaces of an intake valve 11 and an exhaust valve 12) being a bottom surface of the cylinder head 4. The combustion chamber ceiling surface 6U has an upwardly protruding pent-roof shape.

A geometric compression ratio of the cylinder 2, namely, a ratio between a volume of the combustion chamber 6 when the piston 5 is at a top dead center, and a volume of the combustion chamber 6 when the piston 5 is at a bottom dead center, is set, as a preferable value for SPCCI combustion (partial compression ignition combustion) to be described later, to a high compression ratio of not smaller than 15 but not larger than 30, and more preferably, not smaller than 15 but not larger than 18. Setting the geometric compression ratio to a high compression ratio of not smaller than 15 enables to provide an environment in which a fuel-air mixture is easily compression ignited within the combustion chamber 6.

A crank angle sensor SN1 and a water temperature sensor SN2 are mounted on the cylinder block 3. The crank angle sensor SN1 detects a rotational angle (crank angle) of the crankshaft 7, and a rotation speed of the crankshaft 7 (engine rotation speed). The water temperature sensor SN2 detects a temperature (engine water temperature) of cooling water flowing through the cylinder block 3 and the cylinder head 4.

An intake port 9 and an exhaust port 10 opened toward the combustion chamber 6, the intake valve 11 for opening and closing the intake port 9, and the exhaust valve 12 for opening and closing the exhaust port 10 are provided on the combustion chamber ceiling surface 6U of the cylinder head 4. As illustrated in FIGS. 2 and 3, a valve type of the engine according to the present embodiment is a 4 valve type constituted of two intake valves and two exhaust valves. The intake port 9 includes a first intake port 9A and a second intake port 9B. The exhaust port 10 includes a first exhaust port 10A and a second exhaust port 10B. The intake valve 11 is provided each for the first intake port 9A and the second intake port 9B. The exhaust valve 12 is provided each for the first exhaust port 10A and the second exhaust port 10B. A swirl valve 17 capable of opening and closing the second intake port 9B is provided in the second intake port 9B out of the first and second intake ports 9A and 9B (FIG. 1)

The intake valve 11 and the exhaust valve 12 are driven to open and close in association with rotation of the crankshaft 7 by dynamic valve mechanisms 13 and 14 including a pair of camshafts and the like, which are disposed in the cylinder head 4. An intake VVT 13a capable of changing an opening/closing timing of the intake valve 11 is provided in the dynamic valve mechanism 13 for the intake valve 11. An exhaust VVT 14a capable of changing an opening/closing timing of the exhaust valve 12 is provided in the dynamic valve mechanism 14 for the exhaust valve 12. The intake VVT 13a and the exhaust VVT 14a are so-called phase-type variable mechanisms, and change opening timings and closing timings of the intake valve 11 and the exhaust valve 12 simultaneously and by a same amount.

The injector 15 (fuel injection valve) and a spark plug 16 are mounted on the cylinder head 4. The injector 15 directly injects fuel to be supplied from the fuel supply system 150 into the combustion chamber 6. The spark plug 16 ignites fuel-air mixture in which fuel injected from the injector 15 into the combustion chamber 6, and air introduced into the combustion chamber 6 through the intake port 9 (9A and 9B) are mixed. Further, a cylinder pressure sensor SN3 for detecting a pressure (cylinder pressure) of the combustion chamber 6 is provided in the cylinder head 4. As illustrated in FIG. 2, the injector 15 is disposed in such a way that a head portion 15A at a distal end of the injector 15 is exposed in the vicinity of a radial center of the combustion chamber ceiling surface 6U, and in the vicinity of a top portion of a pent-roof portion of the combustion chamber ceiling surface 6U. Further, the spark plug 16 is disposed in such a way that a distal end (electrode portion) of the spark plug 16 is exposed on a slope portion of the pent-roof portion of the combustion chamber ceiling surface 6U, and between the paired intake ports 9A and 9B.

The injector 15 is a multi-injection-hole type injector in which a plurality of injection holes 15B are formed in the head portion 15A. The injector 15 is able to radially inject fuel from the injection holes 15B. An area indicated by the symbol F in FIG. 2 illustrates a spray of fuel injected from each injection hole 15B. A cavity 51 formed by indenting a radially middle area of the crown surface 50 of the piston 5 to a side opposite to the cylinder head 4 (downwardly) is formed in the crown surface 50 of the piston 5. The head portion 15A of the injector 15 is disposed on the combustion chamber ceiling surface 6U in such a way as to face the cavity 51 in the vicinity of a radial center of the combustion chamber 6. Fuel is directly injected from the injection holes 15B toward the cavity 51.

Deposits may be deposited on the injection holes 15B. The deposits are generated by adhesion of injected fuel to the vicinities of the injection holes 15B, and solidification of the adhered fuel by combustion within the combustion chamber 6. When the injection holes 15B are clogged or openings of the injection holes 15B are narrowed by deposition of deposits, a desired amount of fuel may not be supplied to the combustion chamber 6, and a combustion state may be deteriorated. In the present embodiment, a deposition amount of deposits on the injection holes 15B is estimated based on an operating condition of the engine, and when the deposition amount of deposits exceeds a predetermined value, a cleaning mode of removing the deposits by increasing a fuel pressure of fuel to be injected from the injection holes 15B is performed. This point will be described later in detail.

As illustrated in FIG. 2, the cavity of the piston 5 includes a bottom portion 511 constituted of a substantially flat surface, and a side wall 512 curved upwardly from a lateral edge of the bottom portion 511 and rising upwardly. A ridge portion 513 protruding upwardly in association with a pent-roof shape of the combustion chamber ceiling surface 6U, and a squish portion 514 constituted of a semi-circular flat surface are formed on a radially outer side of the crown surface 50 with respect to the cavity 51 (FIG. 3).

The fuel supply system 150 for supplying fuel to the injector 15 includes a fuel tank 151, a low pressure fuel pump 152, a high pressure fuel pump 153 (fuel pressure adjustment mechanism), a fuel rail 154, and a purge passage 155. The fuel tank 151 is a tank for storing fuel. The low pressure fuel pump 152 is an in-tank type pump. The low pressure fuel pump 152 pumps up fuel from the fuel tank 151, and feeds the fuel to the high pressure fuel pump 153. The high pressure fuel pump 153 is a reciprocating type pump. The high pressure fuel pump 153 increases a fuel pressure of fuel fed from the low pressure fuel pump 152, and supplies the fuel to the fuel rail 154. The fuel rail 154 distributes fuel to the injector 15, which is provided in each of the cylinders 2. The purge passage 155 is a passage for recovering fuel gasified within the fuel tank 151, and introducing the gasified fuel to the intake passage 30 for combustion.

The high pressure fuel pump 153 functions as a mechanism for adjusting a fuel pressure of fuel to be supplied to the injector 15. The high pressure fuel pump 153 includes a plunger, and an electromagnetic valve for fuel pressure adjustment. The plunger is driven when coming into contact with a pump cam, which is mounted on a camshaft for driving the exhaust valve 12, and increases a fuel pressure. The electromagnetic valve is a valve for adjusting a fuel pressure of fuel to be supplied to the injector 15 in such a way that the fuel pressure coincides with a set value.

The intake passage 30 is connected to one side surface of the cylinder head 4 in such a way as to communicate with the intake port 9. Air (fresh air) drawn from an upstream end of the intake passage 30 is introduced to the combustion chamber 6 through the intake passage 30 and the intake port 9. An air cleaner 31 for removing foreign matter within intake air, a throttle valve 32 which is openable and closable to adjust a flow rate of intake air, a supercharger 33 for feeding intake air, while compressing the intake air, and an intercooler 35 for cooling intake air compressed by the supercharger 33 are provided in this order in the intake passage 30 from an upstream side of the intake passage 30.

An airflow sensor SN4 for detecting a flow rate of intake air, first and second intake air temperature sensors SN5 and SN7 for detecting a temperature of intake air, and first and second intake air pressure sensors SN6 and SN8 for detecting a pressure of intake air are provided at appropriate positions in the intake passage 30. The airflow sensor SN4 and the first intake air temperature sensor SN5 are provided at a portion between the air cleaner 31 and the throttle valve 32 in the intake passage 30, and detect a flow rate and a temperature of intake air passing through the portion. The first intake air pressure sensor SN6 is provided between the throttle valve 32 and the supercharger 33 in the intake passage 30, and at a downstream portion with respect to a connection port of an EGR passage 451 to be described later, and detects a pressure of intake air passing through the portion. The second intake air temperature sensor SN7 is provided at a portion between the supercharger 33 and the intercooler 35 in the intake passage 30, and detects a temperature of intake air passing through the portion. The second intake air pressure sensor SN8 detects a pressure of intake air at a portion between the intercooler 35 and the intake port 9 in the intake passage 30.

The supercharger 33 is a mechanical supercharger mechanically interconnected to the engine body 1. An electromagnetic clutch 34 capable of electrically switching engagement and disengagement is mounted on the supercharger 33. When the electromagnetic clutch 34 is engaged, a driving force is transmitted from the engine body 1 to the supercharger 33, whereby supercharging of intake air by the supercharger 33 is performed. On the other hand, when the electromagnetic clutch 34 is disengaged, transmission of the driving force is blocked, whereby the supercharging by the supercharger 33 is stopped.

A bypass passage 36 for bypassing the supercharger 33 to allow intake air to flow is provided in the intake passage 30. A bypass valve 37 capable of opening and closing the bypass passage 36 is provided in the bypass passage 36. The bypass passage 36 includes a merging portion 38, which is branched from the intake passage 30 on an upstream side with respect to the supercharger 33, and merges the intake passage 30 on a downstream side of the intercooler 35. The merging portion 38 is disposed near an unillustrated surge tank. The bypass passage 36 also serves as a passage for connecting the EGR passage 451 to be described later, and the surge tank.

The exhaust passage 40 communicates with the exhaust port 10 of each of the cylinders 2 via an exhaust manifold 41. Burnt gas generated within each of the combustion chambers 6 is discharged to the outside through the exhaust port 10, the exhaust manifold 41, and the exhaust passage 40. An upstream catalyst converter 42, and a downstream catalyst converter 43 are respectively provided on an upstream side and a downstream side of the exhaust passage 40 in a flow direction of exhaust gas. A three-element catalyst 421 and a gasoline particulate filter (GPF) 422 are provided on the upstream catalyst converter 42. The three-element catalyst 421 traps harmful components (HC, CO, and NOx) contained in exhaust gas flowing through the exhaust passage 40. The GPF 422 traps particulate materials represented by soot, which is contained in exhaust gas. The downstream catalyst converter 43 is a catalyst converter in which an appropriate catalyst such as a three-element catalyst and an NOx catalyst is held.

A linear $O_2$ sensor SN9 for detecting a concentration of oxygen contained in exhaust gas is disposed at an upstream portion of the exhaust passage 40 with respect to the upstream catalyst converter 42. The linear sensor $O_2$ sensor SN9 is a sensor in which an output value linearly changes according to a level of oxygen concentration, and is able to estimate an air-fuel ratio of fuel-air mixture, based on the output value. Further, an NOx sensor SN10 for measuring an NOx concentration within exhaust gas is disposed between the three-element catalyst 421 and the GPF 422.

The external EGR device 45 includes the EGR passage 451 for connecting the exhaust passage 40 and the intake passage 30, and an EGR cooler 452 and an EGR valve 453 provided in the EGR passage 451. The EGR passage 451 connects a downstream portion of the exhaust passage 40 with respect to the upstream catalyst converter 42, and a portion between the throttle valve 32 and the supercharger 33 in the intake passage 30 to each other. The EGR cooler 452 cools, by heat exchange, exhaust gas (external EGR gas) that returns to the intake passage 30 from the exhaust passage 40 through the EGR passage 451. The EGR valve 453 is disposed in the EGR passage 451 on a downstream side with respect to the EGR cooler 452, and adjusts a flow rate of exhaust gas flowing through the EGR passage 451.

[Control System]

Figure 4:
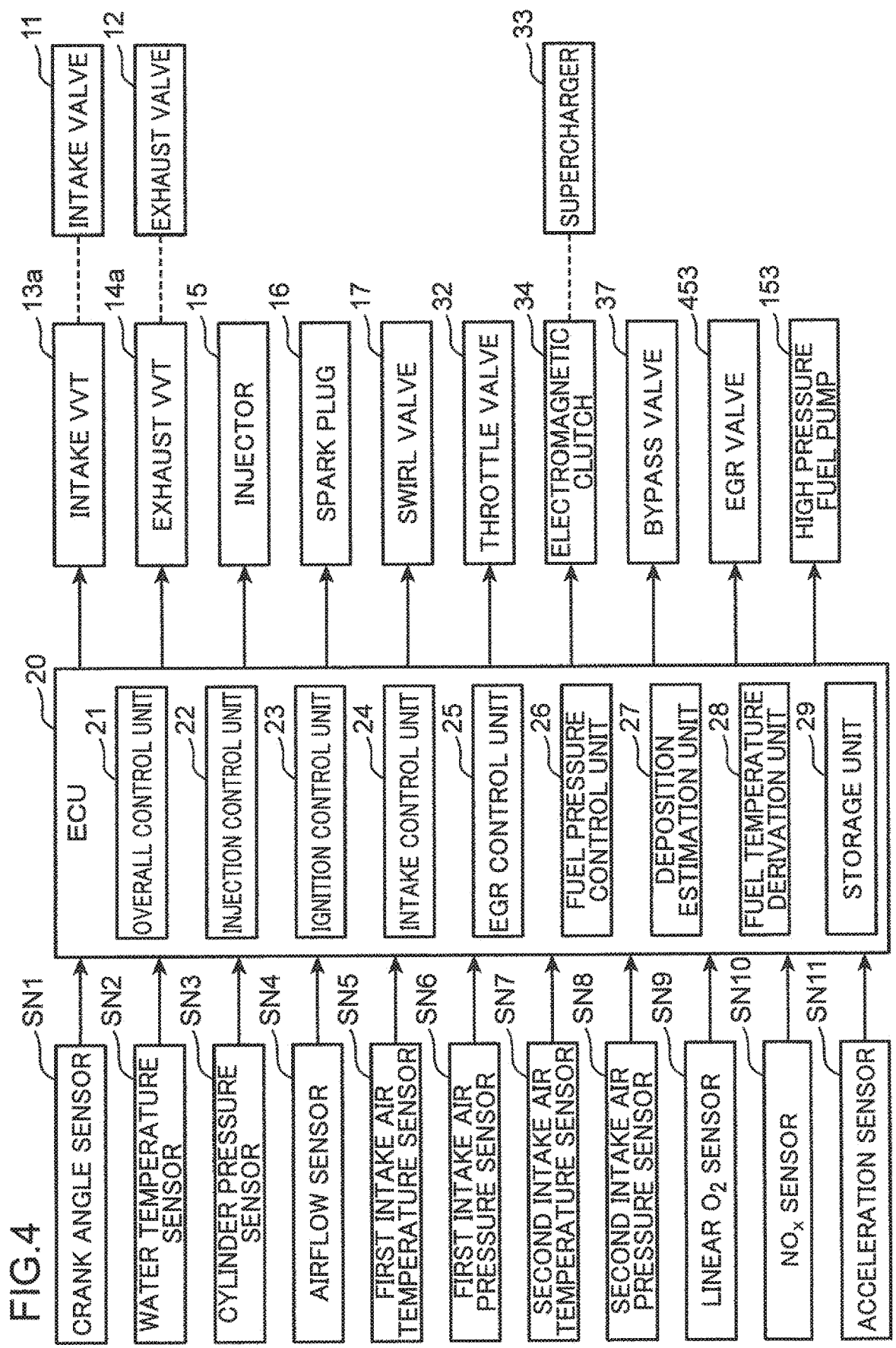
FIG. 4 is a block diagram illustrating a control system of the engine.

Next, a control system of the engine is described. FIG. 4 is a block diagram illustrating a control system of the engine. The control system includes an ECU 20 (a controller constituted of a circuitry). The ECU 20 is a microprocessor for integrally controlling the engine, and is constituted of a known CPU, ROM, RAM, and the like.

Detection signals from various sensors are input to the ECU 20. The ECU 20 is electrically connected to the crank angle sensor SN1, the water temperature SN2, the cylinder pressure sensor SN3, the airflow sensor SN4, the first and second intake air temperature sensors SN5 and SN7, the first and second intake air pressure sensors SN6 and SN8, the linear $O_2$ sensor SN9, and the NOx sensor SN10. The ECU 20 successively receives information detected by these sensors (i.e. a crank angle, an engine rotation speed, an engine water temperature, a cylinder pressure, an intake air flow rate, an intake air temperature, an intake air pressure, an oxygen concentration of exhaust gas, an NOx concentration, and the like). Further, an acceleration sensor SN11 for detecting an opening angle of an unillustrated acceleration pedal is provided in the vehicle. The ECU 20 also receives a detection signal from the acceleration sensor SN11.

The ECU 20 controls each part of the engine, while executing various determinations, calculations, and the like, based on input information from each of the sensors. Specifically, the ECU 20 is electrically connected to the intake VVT 13a, the exhaust VVT 14a, the injector 15, the spark plug 16, the swirl valve 17, the throttle valve 32, the electromagnetic clutch 34, the bypass valve 37, the EGR valve 453, the high pressure fuel pump 153 and the like. The ECU 20 outputs, to these equipment, a signal for controlling each of these equipment, based on a result of the calculations and the like.

The ECU 20 operates in such a way that the ECU 20 functionally includes an overall control unit 21, an injection control unit 22, an ignition control unit 23, an intake control unit 24, an EGR control unit 25, a fuel pressure control unit 26, a deposition estimation unit 27, a fuel temperature derivation unit 28, and a storage unit 29 by causing the ECU 20 to execute a predetermined program.

The overall control unit 21 integrally controls the control units 22 to 26, the deposition estimation unit 27, and the fuel temperature derivation unit 28 of the ECU 20 according to an operating condition and the like of the engine, and causes these units to perform required calculation and control.

The injection control unit 22 is a control module for controlling a fuel injection operation by the injector 15. The injection control unit 22 sets a fuel injection timing at which fuel is injected from the injector 15, based on an operating condition of the engine. Further, the injection control unit 22 outputs a control signal to the injector 15 in such a way as to drive the injector 15, based on the set fuel injection timing. The control signal also serves as a control signal indicating an injection amount of fuel to be injected from the injector 15.

The ignition control unit 23 is a control module for controlling an ignition operation by the spark plug 16. The intake control unit 24 is a control module for adjusting a flow rate and a pressure of intake air to be introduced to the combustion chamber 6, and controls an opening angle of each of the throttle valve 32 and the bypass valve 37, and ON/OFF of the electromagnetic clutch 34. The EGR control unit 25 is a control module for adjusting an amount of EGR gas to be introduced to the combustion chamber 6, and controls an operation of each of the intake VVT 13a and the exhaust VVT 14a, and an opening angle of the EGR valve 453.

The fuel pressure control unit 26 adjusts a fuel pressure of fuel to be supplied to the injector 15 by controlling output of the high pressure fuel pump 153. The fuel pressure control unit 26 outputs a predetermined control signal to the high pressure fuel pump 153 by referring to basic fuel pressure maps (FIGS. 8 and 9), which are determined in advance according to an operating condition of the engine (an engine load and an engine rotation speed), and a combustion pattern; and sets the fuel pressure. Further, when a deposition amount of deposits on the injection holes 15B of the injector 15 exceeds a predetermined value, the fuel pressure control unit 26 sets the fuel pressure by referring to a deposition removal map (FIG. 10) so as to perform a cleaning mode of removing deposits. In the cleaning mode, the fuel pressure control unit 26 outputs a control signal to the high pressure fuel pump 153 in such a way that the fuel pressure is increased in a specific operation range. By the fuel pressure increase, an operation of peeling or scraping off deposits deposited on inner surfaces or vicinities of the injection holes 15B is performed by injected fuel.

The deposition estimation unit 27 performs processing of estimating a deposition amount of deposits on the injection holes 15B, based on an operating condition of the engine. The deposition estimation unit 27 acquires a unit deposition amount, which is a deposition amount of deposits per unit time (e.g. 100 ms), according to an operating condition, and acquires a deposition amount of deposits by integrating the unit deposition amount. In other words, a deposition amount of deposits is basically determined by an operation time of the engine. However, the deposition estimation unit 27 performs integration after correcting each of the unit integration amount according to a fuel injection timing, a fuel pressure, and an injection amount of the injector 15. This point will be described later in detail. The fuel pressure control unit 26 performs the cleaning mode, when a deposition amount of deposits estimated by the deposition estimation unit 27 exceeds a predetermined value The fuel temperature derivation unit 28 performs processing of acquiring a temperature of fuel to be supplied to the combustion chamber 6. Specifically, the fuel temperature derivation unit 28 performs processing of estimating a fuel temperature, from an intake air temperature to be detected by the second intake air temperature sensor SN7, and an engine water temperature to be detected by the water temperature sensor SN2. For example, a thermometer may be installed on the fuel rail 154 to measure a fuel temperature, and a measured value of the temperature may be input to the fuel temperature derivation unit 28. When a fuel temperature is higher than a predetermined value, a fuel pressure increase by the cleaning mode is avoided. This is performed in order to prevent a drawback such that a fuel pressure increase in a high-temperature state of fuel further increases the fuel temperature, and bubbles may be generated in the fuel.

The storage unit 29 stores various programs, setting values, parameters, and the like for controlling the engine. In addition, the storage unit 29 stores operation maps illustrated in FIGS. 5A to 5C, the basic fuel pressure maps illustrated in FIGS. 8 and 9, the deposition removal map illustrated in FIG. 10, and the like.

[Operation Map]

Figure 5A:
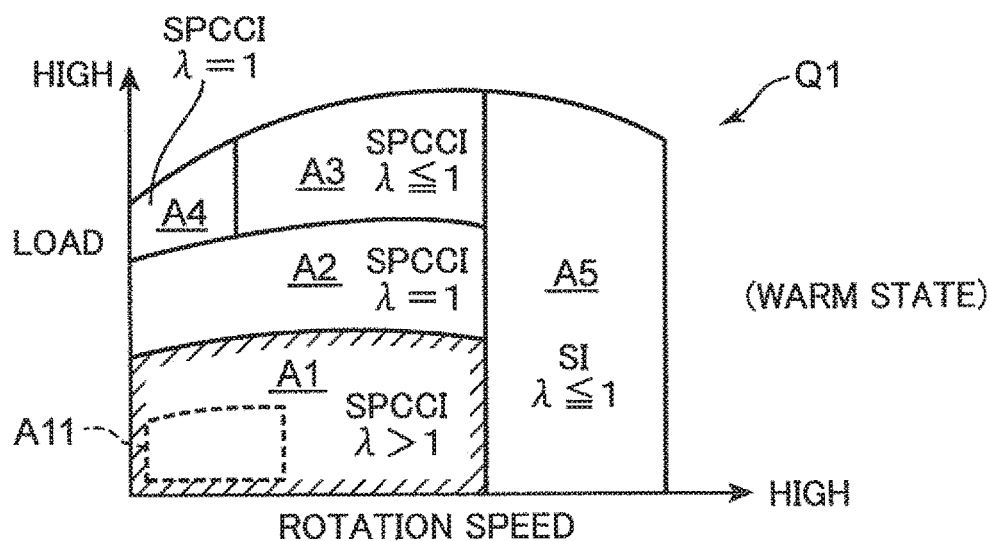
FIGS. 5A to 5C are operation maps in which operation ranges of the engine are classified according to a difference of a combustion pattern.
Figure 5B:
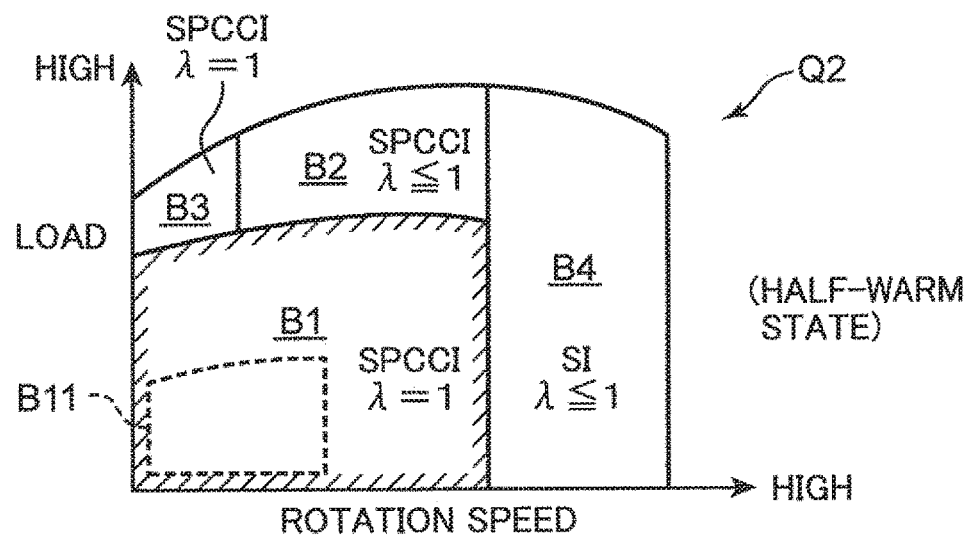
Figure 5C:
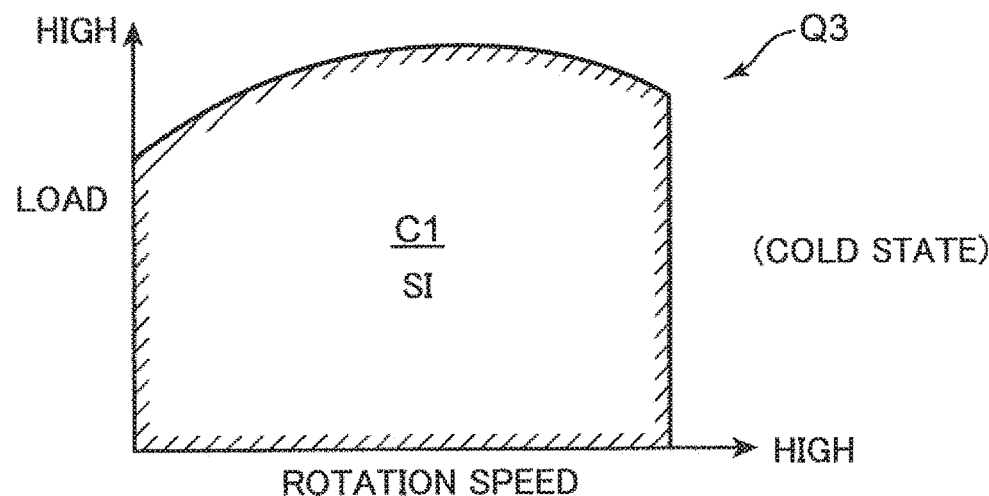

FIGS. 5A to 5C are operation maps in which operation ranges of the engine are classified according to a difference of a combustion pattern. FIGS. 5A to 5C illustrate a difference of combustion control according to a degree of progress of warming up of the engine, and an engine rotation speed/engine load. In the present embodiment, a first operation map Q1 (FIG. 5A) for use in a warm state when warming up of the engine is completed; a second operation map Q2 (FIG. 5B) for use in a half-warm state when warming up of the engine is in progress, and a third operation map Q3 (FIG. 5C) for use in a cold state when the engine is not yet warmed up are prepared. The first operation map Q1 in a warm state includes a first region A1, a second region A2, a third region A3, a fourth region A4, and a fifth region A5, each of which has a different combustion pattern. The second operation map Q2 in a half-warm state includes a sixth region B1, a seventh region B2, an eighth region B3, and a ninth region B4, each of which has a different combustion pattern. The third operation map Q3 in a cold state is constituted of one region, namely, a tenth region C1.

<Warm State>

In the first operation map Q1, the first region A1 is a low to middle speed and low load range, which is acquired by eliminating a part of a high speed range from a low load range in which an engine load is low (including no load). The second region A2 is a low to middle speed and middle load range in which the load is high, as compared with the first region A1. The fourth region A4 is a low speed and high load range in which the load is high and the rotation speed is low, as compared with the second region A2. The third region A3 is a middle speed and high load range in which the rotation speed is high, as compared with the fourth region A4. The fifth region A5 is a high speed range in which the rotation speed is high, as compared with all of the first to fourth regions A1 to A4.

In the first region A1, partial compression ignition combustion (hereinafter, referred to as SPCCI combustion) in which SI combustion and CI combustion are combined is performed. SI combustion is a combustion pattern in which fuel-air mixture is ignited by sparks generated from the spark plug 16, and the fuel-air mixture is forcibly combusted by flame propagation such that a combustion area spreads from the ignition point to the periphery. CI combustion is a combustion pattern in which fuel-air mixture is combusted by self-ignition in a sufficiently high-temperature and high-pressurized environment by compression of the piston 5. SPCCI combustion in which SI combustion and CI combustion are combined is a combustion pattern in which a part of fuel-air mixture within the combustion chamber 6 is subjected to SI combustion by spark ignition to be performed in an environment immediately before the fuel-air mixture is self-ignited, and after the SI combustion (after a further increase in temperature and pressure accompanied by the SI combustion), the other part of the fuel-air mixture within the combustion chamber 6 is subjected to CI combustion by self-ignition. "SPCCI" is abbreviation of Spark Controlled Compression Ignition.

SPCCI combustion has a property such that heat generation in CI combustion becomes sharp, as compared with heat generation in SI combustion. A waveform indicating a heat generation rate by SPCCI combustion is such that a rising inclination at an initial stage of combustion, which is associated with SI combustion, is small, as compared with a rising inclination, which occurs in association with CI combustion thereafter. When a temperature and a pressure within the combustion chamber 6 increase by SI combustion, unburnt fuel-air mixture is self-ignited accompanied by the increase, and CI combustion is started. After CI combustion is started, SI combustion and CI combustion are performed in parallel. Since a combustion speed of fuel-air mixture is fast in CI combustion, as compared with SI combustion, a heat generation rate in CI combustion relatively increases. However, since CI combustion is performed after the piston 5 reaches a compression top dead center, there is no likelihood that an inclination of the waveform indicating the heat generation rate excessively increases. Specifically, after the piston 5 passes the compression top dead center, a motoring pressure is lowered by lowering of the piston 5. This suppresses an increase in heat generation rate. Consequently, an excessive increase in heat generation rate when CI combustion is performed is avoided. In this way, in view of a property such that CI combustion is performed after SI combustion in SPCCI combustion, it is less likely that a heat generation rate being an index of combustion noise excessively increases, and it is possible to suppress combustion noise, as compared with a case that CI combustion is solely performed (a case that an entire amount of fuel is subjected to CI combustion).

Accompanied by completion of CI combustion, SPCCI combustion also finishes. Since a combustion speed is fast in CI combustion, as compared with SI combustion, it is possible to expedite a combustion termination timing, as compared with a case that SI combustion is solely performed (a case that an entire amount of fuel is subjected to SI combustion). Therefore, in SPCCI combustion, it is possible to make a fuel termination timing closer to a compression top dead center in an expansion stroke. This enables to improve fuel efficiency in SPCCI combustion, as compared with a case that SI combustion is solely performed.

In the first region A1, SPCCI combustion described above is performed in a lean environment (SPCCI_$\lambda$>1). Specifically, an opening angle of the throttle valve 32 is set to an opening angle at which an amount of air larger than an amount of air equivalent to a theoretical air-fuel ratio is introduced to the combustion chamber 6 through the intake passage 30. Specifically, the ECU 20 performs control of combusting air-fuel mixture within the combustion chamber 6 by SPCCI combustion in a state that an air-fuel ratio (A/F) being a weight ratio between air (fresh air) to be introduced to the combustion chamber 6 through the intake passage 30, and fuel to be injected to the combustion chamber 6 by the injector 15 becomes larger than a theoretical air-fuel ratio (14.7).

In a major part of the first region A1, internal EGR in which burnt gas is allowed to remain within the combustion chamber 6 is performed. The ECU 20 controls the intake VVT 13a and the exhaust VVT 14a to drive the intake valve 11 and the exhaust valve 12 in such a way as to form a valve overlap period during which both of the intake valve 11 and the exhaust valve 12 are opened, with an exhaust top dead center being interposed, and opens the exhaust valve 12 until the piston 5 passes the exhaust top dead center (until an initial stage of an intake stroke). Thus, burnt gas is drawn back from the exhaust port 10 into the combustion chamber 6, and internal EGR is achieved. A valve overlap period is set in such a way that a cylinder temperature appropriate for acquiring a desired waveform of SPCCI combustion is achieved.

In the second region A2, control is performed in which a fuel-air mixture is subjected to SPCCI combustion in an environment in which an air-fuel ratio within the combustion chamber 6 substantially coincides with a theoretical air-fuel ratio (SPCCI_$\lambda$=1). An opening angle of the throttle valve 32 is set to an opening angle at which an amount of air equivalent to a theoretical air-fuel ratio is introduced to the combustion chamber 6 through the intake passage 30. In the second region A2, the EGR valve 453 is opened, and external EGR gas is introduced to the combustion chamber 6. In view of the above, in the second region A2, a gas air-fuel ratio (G/F) being a weight ratio between total gas and fuel within the combustion chamber 6 becomes larger than the theoretical air-fuel ratio (14.7). Therefore, when the engine is operated in the second region A2, control is performed in which a fuel-air mixture is subjected to SPCCI combustion, while forming a G/F lean environment in which G/F is larger than the theoretical air-fuel ratio, and the A/F substantially coincides with the theoretical air-fuel ratio. An opening angle of the EGR valve 453 is set to an opening angle at which the theoretical air-fuel ratio is achieved on the basis of the A/F.

In the third region A3, control is performed in which a fuel-air mixture is subjected to SPCCI combustion in an environment in which the A/F within the combustion chamber 6 is slightly larger than the theoretical air-fuel ratio (SPCCI_$\lambda\leq$1). Since a fuel injection amount appropriate for a middle speed and high load range is necessary, a fuel rich environment is set. On the other hand, in the fourth region A4 in which the engine is in a low speed operation range, although the load is high, control is performed in which a fuel-air mixture is subjected to SPCCI combustion in an environment in which the A/F substantially coincides with the theoretical air-fuel ratio (SPCCI_$\lambda$=1). In the fifth region A5, a relatively ordinary SI combustion is performed. The A/F is set to a value equal to or slightly higher than the theoretical air-fuel ratio (SI_$\lambda\leq$1). In all the regions A1 to A5, it is possible to adjust the A/F by an opening angle of the EGR valve 453.

<Half-Warm State>

In the second operation map Q2 in a half-warm state, the sixth region B1 is associated with a region formed by combining the first region A1 and the second region A2 in the first operation map Q1. The seventh region B2, the eighth region B3, and the ninth region B4 are respectively associated with the third region A3, the fourth region A4, and the fifth region A5 in the first operation map Q1.

In the sixth region B1, similarly to the second region A2 in the first operation map Q1, control is performed in which a fuel-air mixture is subjected to SPCCI combustion in an environment in which the A/F within the combustion chamber 6 substantially coincides with the theoretical air-fuel ratio (SPCCI_$\lambda$=1). In at least a part of the sixth region B1, a valve overlap period is set, and internal EGR in which burnt gas is allowed to remain within the combustion chamber 6 is performed. The supercharger 33 is brought to an ON-state in a relatively high load range and a relatively high speed range in the sixth region B1, and is brought to an OFF-state in a range other than the above in the sixth region B1.

In the seventh region B2, the eighth region B3, and the ninth region B4, controls similar to the controls in the third region A3, the fourth region A4, and the fifth region A5 of the first operation map Q1 are respectively performed. Specifically, in the seventh region B2, a fuel-air mixture is subjected to SPCCI combustion in an environment in which the A/F within the combustion chamber 6 is slightly larger than the theoretical air-fuel ratio (SPCCI_$\lambda\leq$1). In the eighth region B3, a fuel-air mixture is subjected to SPCCI combustion in an environment in which the A/F substantially coincides with the theoretical air-fuel ratio (SPCCI_$\lambda$=1). In the ninth region B4, ordinary SI combustion is performed, and the A/F is set to a value equal to or slightly larger than the theoretical air-fuel ratio (SI_$\lambda\leq$1).

<Cold State>

The third operation map Q3 in a cold state is constituted only of the tenth region C1. In the tenth region C1, control is performed in which fuel injected mainly in an intake stroke is subjected to SI combustion, while mixing the fuel with air. The control in the tenth region C1 is similar to combustion control of a general gasoline engine.

[Injection Pattern]

Next, fuel injection patterns in the above operation ranges are exemplified. In this section, fuel injection patterns of SPCCI_λ=1 combustion to be performed in the sixth region B1 and the second region A2, and SPCCI_λ>1 combustion to be performed in the second region A1 are exemplified.

FIG. 6 is a graph illustrating a relationship between requested torque and a fuel injection timing, when SPCCI_λ=1 combustion is performed. When the above combustion is performed, batch-type intake injection in which a desired amount of fuel is injected in a batch manner in an intake stroke is a basic pattern. However, in a predetermined low load range, split injection in which fuel is injected in a split manner in an intake stroke and in a compression stroke is performed. Specifically, when requested torque is equal to or larger than a predetermined threshold value P1, fuel of an injection amount associated with the requested torque is injected in a batch manner at a predetermined crank angle (CA) in an intake stroke. On the other hand, when the requested torque is smaller than the predetermined threshold value P1, first-time injection is performed in an intake stroke, and second-time injection is performed at a predetermined angle in a compression stroke. Such split injection is performed in a specific region B11, which is a low load and low speed range of the sixth region B1.

A timing at which the first-time injection is started is a timing at which the piston 5 is away (lowered) from an exhaust top dead center (TDC) by a predetermined crank angle ΔCA1. On the other hand, a timing at which the second-time injection is started is a timing at which the piston 5 approaches (is raised to) a compression top dead center by a crank angle ΔCA2. It should be noted that ΔCA1>ΔCA2. In other words, the second-time injection is performed at a timing close to a time when the piston 5 is at a TDC, as compared with the first-time injection. Further, whereas, in the first-time injection, the piston 5 is away from the injector 15, in the second-time injection, fuel is injected in a state that the piston 5 approaches the injector 15. Therefore, in the second-time injection, flowing back of injected fuel from the cavity 51 becomes an issue (which will be described later in detail with reference to FIG. 11).

Next, FIG. 7 is a graph illustrating a relationship between requested torque and a fuel injection timing, when SPCCI_λ>1 combustion is performed. When the above combustion is performed, a 3-times split intake injection in which a desired amount of fuel is injected three times in a split manner in an intake stroke is a basic pattern. However, in a predetermined low load range, in order to reduce generated torque without deteriorating combustion performance, an injection pattern is changed in such a way that one of three injections is performed in a compression stroke. Specifically, when the requested torque is equal to or larger than a predetermined threshold value P2, fuel of an injection amount associated with the requested torque is injected in a split manner by first-time injection, second-time injection, and third injection at a crank angle (CA), which is set in advance for each of the injections in an intake stroke. On the other hand, when the requested torque is smaller than the predetermined threshold value P2, the injection pattern is changed in such a way that third-time injection is performed in a compression stroke. Such a pattern change is performed in a specific region A11, which is a low load and low speed range of the first region A1.

When the requested torque is equal to or larger than the threshold value P2 (when the engine is in a high load state), the third-time injection is performed at a timing relatively close to a time when the piston 5 is at a bottom dead center (BDC). On the other hand, when the requested torque is smaller than the threshold value P2 (when the engine is in a low load state), the third-time injection is performed at a timing close to a time when the piston 5 is at a compression top dead center. In other words, the third-time injection when the engine is in a low load state is performed at a timing close to a time when the piston 5 is at a TDC, as compared with a case that the third-time injection when the engine is in a high load state is performed. Therefore, in the third-time injection when the engine is in a low load state, flowing back of injected fuel from the cavity 51 becomes an issue.

[Specific Example of Fuel Pressure Map]

As described above, the fuel pressure control unit 26 sets a fuel pressure of fuel to be supplied to the injector 15 according to an operating condition. When a fuel pressure is set, the fuel pressure control unit 26 accesses to the storage unit 29, and refers to a fuel pressure map in which a fuel pressure setting value is determined in advance in association with each of an engine load (fuel injection amount) and an engine rotation speed. Further, the fuel pressure control unit 26 reads, from the fuel pressure map, a fuel pressure value associated with a current engine load and a current engine rotation speed, and sets a determined fuel pressure by controlling the high pressure fuel pump 153.

FIG. 8 is one example of a basic fuel pressure map for use in setting a fuel pressure of the injector 15, when SI combustion and SPCCI_λ=1 combustion are performed. A vertical axis in FIG. 8 denotes an engine load, and a horizontal axis in FIG. 8 denotes an engine rotation speed (rpm). A unit of fuel pressure is MPa. Roughly speaking, in a low to middle load range, a fuel pressure is set low (40 MPa) in a low engine rotation speed range, and a fuel pressure is set high (60 MPa) in a high speed range. On the other hand, in a middle to high load range, a fuel pressure is relatively suppressed (30 MPa in a low speed range, and 40 MPa in a high speed range). This is performed in order to avoid lowering of fuel efficiency resulting from an increase in mechanical load by the high pressure fuel pump 153. As described above, since the high pressure fuel pump 153 is driven by a camshaft for driving the exhaust valve 12, the high pressure fuel pump 153 becomes accessory loss for the engine body 1. In view of the above, accessory loss is suppressed by setting a fuel pressure low in a middle to high load range.

FIG. 9 is one example of a basic fuel pressure map for use in setting a fuel pressure of the injector 15, when SPCCI_λ>1 combustion is performed. A vertical axis in FIG. 9 denotes a fuel injection amount (mg) associated with an engine load, and a horizontal axis in FIG. 9 denotes an engine rotation speed (rpm). A unit of fuel pressure is MPa. In the SPCCI_λ>1 combustion, a fuel pressure is set to 40 MPa, irrespective of an engine load and an engine rotation speed. This is because it is not necessary to increase a fuel pressure by intentionally increasing accessory loss in view of that a fuel injection amount is small in lean combustion, and as illustrated in FIG. 7, fuel injection is performed three times in a split manner.

FIG. 10 is one example of a fuel pressure map for deposition removal, which is used in performing a cleaning mode of the injector 15, when SI combustion and SPCCI_λ=1 combustion are performed. As described above, when a deposition amount of deposits on the injection holes 15B of the injector 15 exceeds a predetermined value, the fuel pressure control unit 26 performs a cleaning mode of removing the deposits. In the cleaning mode, deposits deposited on the vicinities of the injection holes 15B are scraped off by an injection pressure of fuel from the injection holes 15B by increasing a fuel pressure. When the cleaning mode is performed, the fuel pressure control unit 26 sets a fuel pressure of the injector 15 by switching a fuel pressure map to be referred to from the basic fuel pressure map illustrated in FIG. 8 to the fuel pressure map for deposition removal exemplified in FIG. 10.

In the fuel pressure map for deposition removal in FIG. 10, when the engine is operated in a low to middle load range (0.125 to 0.35/0.45), and in a low engine rotation speed range (500 to 3000 rpm), a fuel pressure is set to 60 MPa from 40 MPa in the basic fuel pressure map. In other words, in the operation range, a fuel pressure is increased, when the cleaning mode is performed. By such a fuel pressure increase, deposits in the vicinities of the injection holes 15B are removed.

On the other hand, in the fuel pressure map for deposition removal, several regions in which a fuel pressure is not increased, and a fuel pressure is set as illustrated in the basic fuel pressure map are present. First, in an operation range, namely, in a low to middle load range, and in a high engine rotation speed range (3000 to 6500 rpm), a fuel pressure is kept to 60 MPa. This is because in the above operation range, a high fuel pressure of 60 MPa at which deposits are removable is set in the basic fuel pressure map, and it is not necessary to further increase the fuel pressure.

Further, in the fuel pressure map for deposition removal, in an operation range, namely, in a high engine load range (0.4/0.8 to 1.4) and in a low engine rotation speed range (500 to 2750 rpm), a fuel pressure is kept to 30 MPa, which is the same as in the basic fuel pressure map. This is performed in order to avoid an increase in accessory loss, in view of a drawback such that a fuel pressure increase in a high load range increases accessory loss by driving of the high pressure fuel pump 153 in the engine body 1. Further, since a fuel injection amount is increased in a high load operation range, injecting a large amount of fuel enables to remove deposits from the injection holes 15B, without increasing a fuel pressure. This is another reason why a fuel pressure is not increased.

Further, also in an operation range, namely, in a high engine load range (0.8 to 1.4) and in a high engine rotation speed range (3000 to 6500 rpm), a fuel pressure is kept to 40 MPa. This is performed in order to avoid a further increase in accessory loss, in view of a drawback such that a fuel pressure increase in a high load and high speed range further increases accessory loss by the high pressure fuel pump 153. Further, in a high speed operation range, a total time during which the injection holes 15B are opened increases, and a fuel injection amount per unit time increases. Thus, it is possible to remove deposits from the injection holes 15B by injecting a large amount of fuel without increasing a fuel pressure. This is another reason why a fuel pressure is not increased.

In contrast, when SPCCI_$\lambda$>1 combustion is performed, the fuel pressure control unit 26 does not increase a fuel pressure for a cleaning mode. In a situation in which combustion is performed by generating a fuel-air mixture in a lean state, as exemplified in a case where SPCCI_$\lambda$>1 combustion is performed, increasing a fuel pressure of the injector 15 may lead to a tendency that linearity of a fuel injection amount cannot be secured from the injector 15. Specifically, the fuel pressure control unit 26 controls to perform an injection operation by outputting, to the injector 15, a drive pulse having a pulse width associated with an opening period of the injection holes 15B. In a case where lean combustion is performed, since a fuel injection amount from the injector 15 is relatively small, the pulse width is set to a relatively small value. In this situation, when a fuel pressure is increased, an injection amount per unit time increases. Therefore, it is necessary to reduce the pulse width in order to suppress the injection amount to a predetermined injection amount.

As a characteristic of a general-purpose injector 15, linearity of a fuel injection amount is lowered in a range in which a pulse width of a drive pulse is too narrow. In other words, there is a tendency that an opening period of the injection holes 15B, and an injection amount are not proportional to each other. When the linearity is lowered, an intended fuel-air mixture distribution cannot be secured in the combustion chamber 6, and combustion stability may be lowered. In particular, in the present embodiment, when SPCCI_$\lambda$>1 combustion is performed, 3-times split intake injection is a basic pattern (FIG. 7). Specifically, since fuel of an amount required for achieving target torque is injected three times in a split manner, a pulse width per injection is basically small. Therefore, when a fuel pressure is increased in SPCCI_$\lambda$>1 combustion, combustion stability may be lowered. In view of this, when SPCCI_$\lambda$>1 combustion is performed, a cleaning mode is not performed. Therefore, a fuel pressure map for deposition removal is not prepared.

[Deposition Prediction of Deposits]

Since a fuel pressure increase basically accompanies in the cleaning mode, accessory loss by the high pressure fuel pump 153 becomes an issue. In view of this, it is desired to perform a cleaning mode only when deposition removal is necessary. In order to timely perform the cleaning mode, it is essential to accurately determine a deposition amount of deposits. Basically, a deposition amount of deposits increases in proportion to an operation time of the engine body 1. However, a deposition amount of deposits is not simply proportional to an operation time, and varies by the presence or absence of occurrence of flowing back of injected fuel from the cavity 51 of the piston 5.

Figure 11:
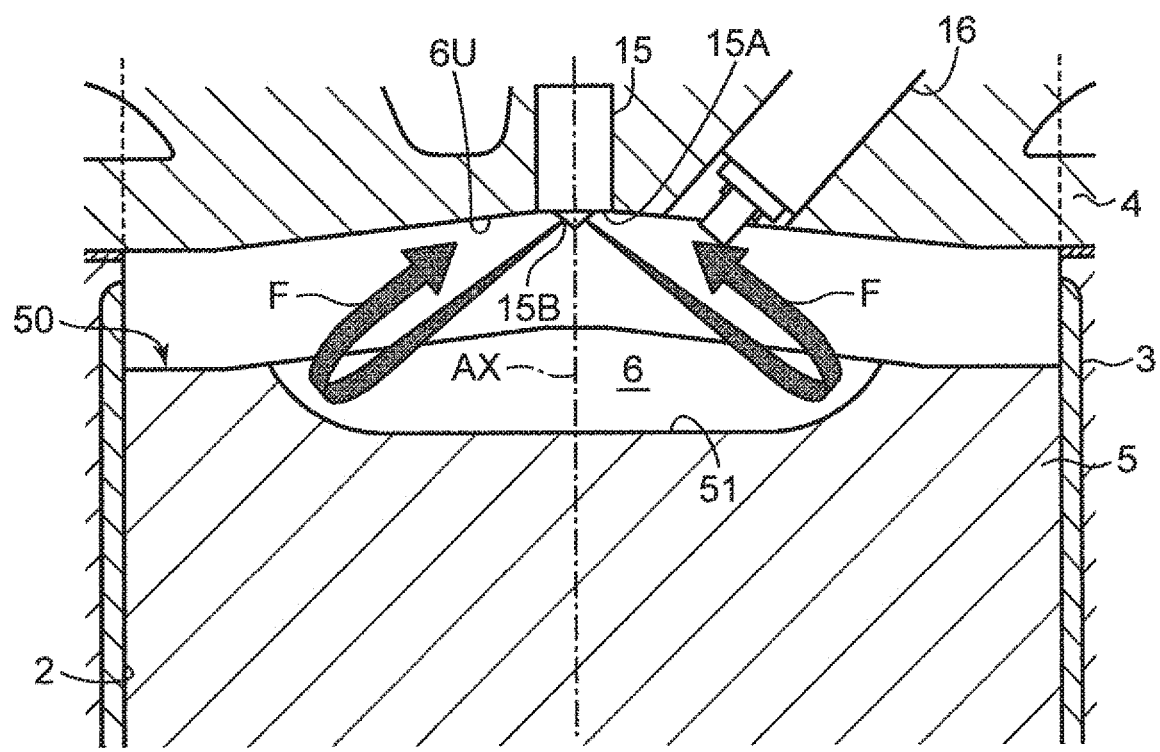
FIG. 11 is a cross-sectional view illustrating how fuel injected from the injector flows back from a surface of a cavity.

FIG. 11 is a cross-sectional view illustrating flowing back of fuel injected from the injection holes 15B of the injector 15, from a surface of the cavity 51. In the present embodiment, the head portion 15A having the injection holes 15B is disposed on the combustion chamber ceiling surface 6U in such a way as to face the cavity 51 in the vicinity of a radial center of the combustion chamber 6, and the center-injection type injector 15 for directly injecting fuel toward the cavity 51 is employed. In a case where an injector of a center injection type is employed, when fuel injection is performed in a state that the piston 5 is near a top dead center, flowing back of injected fuel from the cavity 51 may occur.

As illustrated in FIG. 11, a spray F of fuel injected from each injection hole 15B are sprayed onto a bottom surface of the cavity 51. Thereafter, the spray F flies along an uprising curved shape of the vicinity of a peripheral edge of the cavity 51. Then, the spray F moves toward the radial center of the combustion chamber 6 in which the head portion 15A of the injector 15 is disposed, while being guided along the combustion chamber ceiling surface 6U. The flowing-back spray F adheres to the vicinity of the injection hole 15B, and may cause deposition of deposits. Adhesion of the flowing-back spray F to the vicinity of the injection hole 15B is likely to occur, when the piston 5 is near a top dead center.

FIG. 12A is a schematic diagram illustrating flowing back of injected fuel in an intake stroke. In an intake stroke, the piston 5 is lowered, as a crank angle increases. In other words, as the piston 5 approaches an advanced side, an interval between the head portion 15A (injection holes 15B) of the injector 15, and the cavity 51 of the piston 5 is shortened. Therefore, by setting a fuel injection timing from the injector 15 in a period during which the piston 5 is present on the advanced side, the flowing-back spray F from the cavity 51 is likely to adhere to the vicinity of the injection hole 15B.

The above phenomenon is opposite in a compression stroke. FIG. 12B is a schematic diagram illustrating flowing back of injected fuel. In a compression stroke, the piston 5 is raised, as the crank angle increases. In other words, as the piston 5 approaches a retarded side, an interval between the injection holes 15B of the injector 15, and the cavity 51 is shortened. Therefore, by setting a fuel injection timing from the injector 15 in a period during which the piston 5 is present on the retarded side, the flowing-back spray F from the cavity 51 is likely to adhere to the vicinity of the injection hole 15B.

[Correction of Deposition Amount of Deposits]

As described above, the deposition estimation unit 27 acquires a unit deposition amount being a deposition amount of deposits per 100 ms, for example, according to an operating condition, and acquires a deposition amount of deposits by integrating the unit deposition amount. As described above, deposition of deposits may occur resulting from adhesion of the flowing-back spray F depending on a fuel injection timing. Conversely, when an injection timing is set to a timing at which adhesion of the flowing-back spray F does not substantially occur, it can be said that it is appropriate to derive a unit deposition amount by correcting in such a way as to remove deposits by the amount of adhesion of the flowing-back spray F. In view of this, the deposition estimation unit 27 corrects in such a way that as compared with a unit deposition amount when a fuel injection timing is set to a first timing away from a top dead center of the piston 5 by a crank angle (first period), a unit deposition amount decreases when a fuel injection timing is set to a second timing away by a crank angle (second period) longer than the first period.

Referring to FIG. 12A, when fuel injection is performed by the injector 15 in an intake stroke, the deposition estimation unit 27 corrects in such a way that a unit deposition amount decreases when a fuel injection timing is set to a retarded side, as compared with a unit deposition amount when a fuel injection timing is set to an advanced side. Specifically, in an intake stroke, the piston 5 is lowered and is away from the injector 15, as a fuel injection timing approaches a retarded side, and adhesion of the flowing-back spray F is less likely to occur. In view of the above, the deposition estimation unit 27 corrects in such a way as to decrease a unit deposition amount when a fuel injection timing is set to a retarded side, as compared with a unit deposition amount when a fuel injection timing is set to an advanced side, by multiplying a subtraction coefficient that is set in advance, for example, even when a fuel pressure or an injection amount is the same.

Further, referring to FIG. 12B, when fuel injection is performed by the injector 15 in a compression stroke, the deposition estimation unit 27 corrects in such a way that a unit deposition amount decreases when a fuel injection timing is set to an advanced side, as compared with a unit deposition amount when a fuel injection timing is set to a retarded side. Specifically, in a compression stroke, the piston 5 is located to a lower position and is away from the injector 15, as a fuel injection timing approaches an advanced side, and adhesion of the flowing-back spray F is less likely to occur. In view of the above, the deposition estimation unit 27 corrects in such a way as to decrease a unit deposition amount when a fuel injection timing is set to an advanced side, as compared with a unit deposition amount when a fuel injection timing is set to a retarded side by multiplying a subtraction coefficient similarly to the above, even when a fuel pressure or an injection amount is the same.

It is desirable to correct the unit deposition amount by using a fuel pressure or a fuel injection amount, for example, in addition to the height position and the like of the piston 5 as described above. In an operation range in which a fuel pressure is set high in the engine body 1, since fuel is injected at a high pressure from the injection holes 15B, deposition of deposits is less likely to occur. Further, when a high fuel pressure is set, deposits deposited on the injection holes 15B are naturally removed, and it is appropriate to correct the unit deposition amount, taking into consideration an amount corresponding to recovery to an original state (an amount of deposits that have already been removed).

In an operation range in which a fuel injection amount is set large in the engine body 1, since a large amount of fuel is injected from the injection holes 15B, deposition of deposits is less likely to occur. Conversely, in an operation range in which a fuel injection amount is set small, deposits are likely to be deposited. Therefore, it is appropriate to correct the unit deposition amount in an offset manner in such a way as to adjust a deposition amount of deposits according to a fuel injection amount.

In view of the above, the deposition estimation unit 27 acquires the unit deposition amount by applying the following equation.

$$\text{Unit deposition amount} = \text{deposition amount per operation time} \times (\text{rotational load coefficient} \times \text{fuel pressure} + \text{injection amount offset coefficient}) \quad (1)$$

In the equation (1), the deposition amount per operation time is a deposition amount of deposits per unit time (e.g. 100 ms), which is a processing calculation cycle of an estimation amount of deposits. For example, a value acquired by multiplying a deposition amount of deposits, which is assumed to be deposited on the injection holes 15B when fuel injection of 1 ms is performed, by a duration of unit time, is a deposition amount per operation time, and is a value that increases according to an operation time.

The rotational load coefficient is a correction coefficient to be determined according to a fuel injection timing. In the present embodiment, as exemplified in FIGS. 6 and 7, a fuel injection timing is changed by an engine load and an engine rotation speed. The rotational load coefficient is a coefficient for correcting the unit deposition amount according to a degree of occurrence of adhesion of the flowing-back spray F, which results from a fuel injection timing (closeness to a TDC of the piston 5). The fuel pressure coefficient is a coefficient for correcting the unit injection amount to a minus side in an operation range in which a fuel pressure is set to a fuel pressure at which deposits are substantially removed. The injection amount offset coefficient is a coefficient for offsetting a multiplication value of (rotational load coefficient×fuel pressure coefficient) to a minus side (or to a plus side) according to a deposition tendency that deposits are less likely to deposit when a fuel injection amount is large, as compared with a case when a fuel injection amount is small. In other words, when it is assumed that a fuel pressure at which deposits are substantially removed is a reference fuel pressure, and a fuel injection amount by which deposits are not substantially deposited is a reference injection amount, the deposition estimation unit 27 corrects the unit deposition amount to a minus side, when the fuel pressure control unit 26 sets a fuel pressure higher than the reference fuel pressure, and the injection control unit 22 sets a fuel injection amount larger than the reference injection amount.

FIGS. 13A and 13B are one example of coefficient maps indicating a rotational load coefficient in the equation (1). These maps are stored in the storage unit 29. FIG. 13A is a coefficient map on a rotational load coefficient for use in correcting the unit deposition amount, when SI combustion and SPCCI_$\lambda$=1 combustion are performed. As described above with reference to FIG. 6, when SPCCI_$\lambda$=1 combustion is performed, fuel is injected in a split manner by dividing fuel into first-time injection and second-time injection in a low load range. Further, the second-time injection is performed at a timing (first timing) when the piston 5 is near the TDC. Therefore, it can be said that the range is a range in which flowing back of the spray F from the cavity 51 is likely to occur, and deposits are deposited on the injection hole 15B. In view of the above, in the coefficient map of FIG. 13A, in a low load range (a range in which the load is substantially equal to or smaller than 0.5), "coefficient=1" is set, and correction of decreasing the unit deposition amount based on a deposition amount per operation time is not performed.

On the other hand, in a high load range (a range in which the load is substantially equal to or larger than 0.6), "coefficient=0.8" is set, and correction of decreasing the unit deposition amount based on a deposition amount per operation time is performed. This is because, in a high load operation range of SPCCI_$\lambda$=1 combustion, only the first combustion is performed, and it is assumed that flowing back of the spray F is not performed, since the first-time injection is performed at a timing (second timing), which is relatively away from a time when the piston 5 is at the TDC. In other words, correction of decreasing the unit deposition amount is performed, taking into consideration that flowing back of the spray F to the injection hole 15B does not occur. It should be noted that a low load range in this case corresponds to the specific region B11 in the second operation map Q2 in FIG. 5B. In the present embodiment, by setting a coefficient in the specific region B11 to "1" and setting a coefficient in the other regions to "0.8", correction is performed in such a way that the unit deposition amount in the specific region B11 is relatively large, as compared with the other operation regions.

FIG. 13B is a coefficient map on a rotational load coefficient for use in correcting the unit deposition amount, when SPCCI_$\lambda$>1 combustion is performed. As described above with reference to FIG. 7, when SPCCI_$\lambda$>1 combustion is performed, in a low load range, the third-time injection is performed at a timing (first timing) close to a time when the piston 5 is near a TDC in a compression stroke. Therefore, it can be said that the low load range is a range in which flowing back of the spray F from the cavity 51 is likely to occur, and deposits are deposited on the injection hole 15B. In view of the above, in the coefficient map of FIG. 13B, "coefficient=1" is set in a low load range (a range in which an injection amount is 8 mg or less), and correction of decreasing the unit deposition amount based on a deposition amount per operation time is not performed.

On the other hand, in a high load range (a range in which an injection amount is 10 mg or more), "coefficient=0.9" is set, and correction of decreasing the unit deposition amount based on a deposition amount per operation time is performed. This is because, in a high load operation range of SPCCI_$\lambda$>1 combustion, the third-time injection is performed at a timing (second timing) close to a time when the piston 5 is at a BDC, and it is assumed that flowing back of the spray F is not performed. Therefore, correction of decreasing the unit deposition amount is performed, taking into consideration that flowing back of the spray F to the injection hole 15B does not occur. It should be noted that a low load range in this case corresponds to the specific region A11 in the first operation map Q1 in FIG. 5A. In the present embodiment, by setting the coefficient as described above, correction is performed in such a way that the unit deposition amount in the specific region A11 is relatively large, as compared with the other operation ranges.

Figure 14:
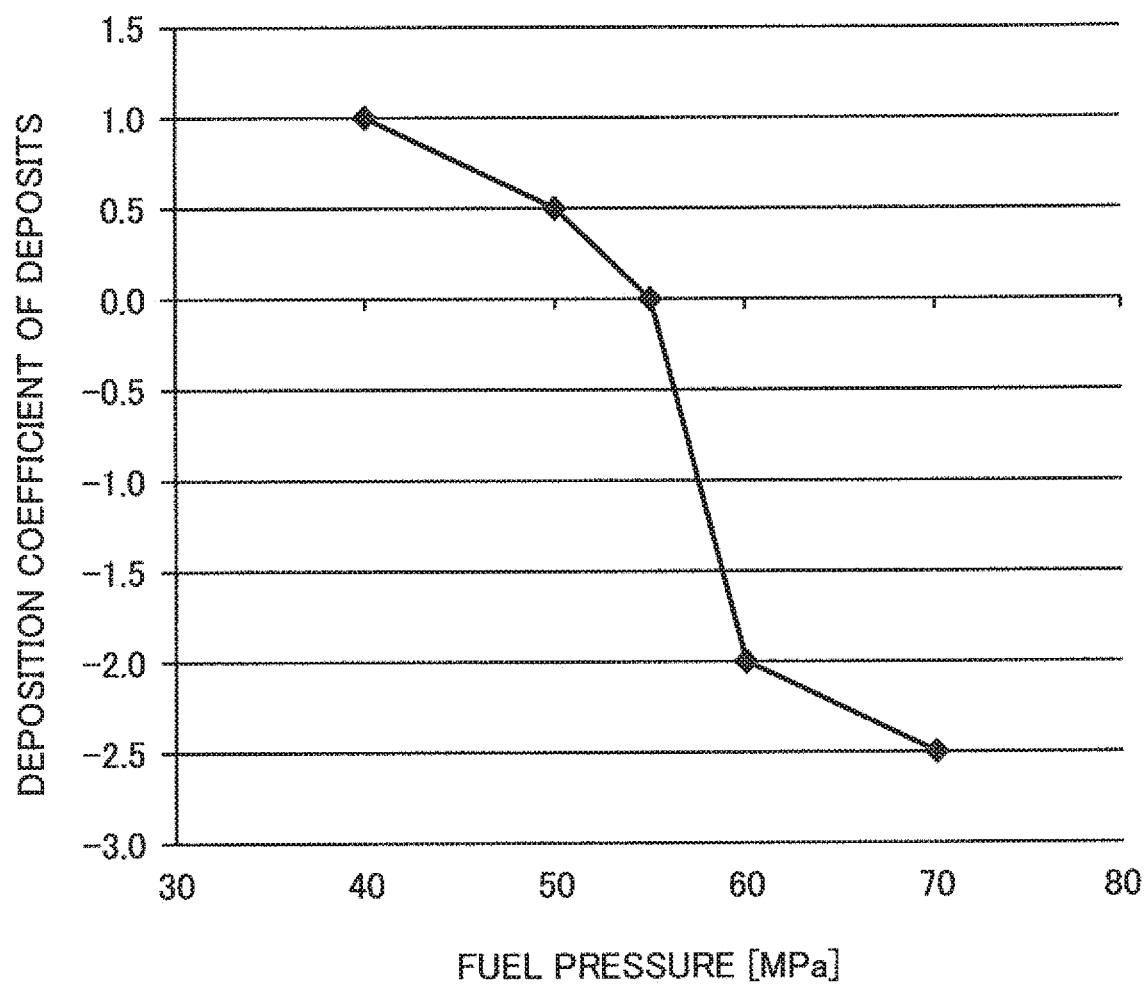
FIG. 14 is one example of a map on a fuel pressure coefficient for use in performing integration of a deposition amount of deposits.

FIG. 14 is one example of a coefficient map indicating a fuel pressure coefficient in the equation (1). The map is stored in the storage unit 29. Generally, when a fuel pressure is high, deposits deposited on the vicinities of the injection holes 15B are tended to be removed by an injected stream of fuel. Conversely, when a fuel pressure is low, deposits are tended to be deposited. A vertical axis in FIG. 14 denotes a deposition coefficient of deposits. In a range in which the sign of the deposition coefficient is minus, deposits are removed, and in a range in which the sign of the deposition coefficient is plus, deposits are deposited.

As illustrated in FIG. 14, a deposition coefficient of deposits when a fuel pressure is 55 MPa is ±0. The fuel pressure is a fuel pressure at which neither deposition nor removal of deposits to and from the injection holes 15B occurs. In view of that deposits are deposited when a fuel pressure is lower than 55 MPa, a deposition coefficient of deposits has a plus sign, and in view of that deposits are removed when a fuel pressure is equal to or higher than 55 MPa, a deposition coefficient of deposits has a minus sign. For example, when a fuel pressure is 40 MPa, since the coefficient is 1.0, as far as a rotational load coefficient is 1.0, the deposition amount per operation time coincides with the unit deposition amount. On the other hand, when a fuel pressure is 50 MPa, since the coefficient is 0.5, the deposition amount per operation time coincides with a unit deposition amount which is decreased to one-half. Further, when a fuel pressure is equal or higher than 55 MPa, the unit deposition amount has a minus value, and consequently, an integrated value of deposition amounts of deposits so far is subtracted.

FIGS. 15A and 15B are one example of an injection amount offset coefficient for use in integrating a deposition amount of deposits. The map is stored in the storage unit 29. FIG. 15A is an injection amount offset coefficient map for use in offset correcting a multiplication value of (rotational load coefficient×fuel pressure coefficient) when SPCCI_$\lambda$=1 combustion is performed. Since a deposition tendency that, as a fuel injection amount increases, deposits are less likely to be deposited, the injection amount offset coefficient map is set to such a state that offset correction is not performed (coefficient=0.0) in a low load range (a range in which the load is 0.6 or smaller). On the other hand, in a high load range (a range in which the load is 0.7 or larger), an injection amount offset coefficient having a minus value is set. Therefore, in the high load range, a multiplication value of (rotational load coefficient×fuel pressure coefficient) is offset corrected to a minus side.

[Fuel Pressure Switching Control Flow]

Figure 16:
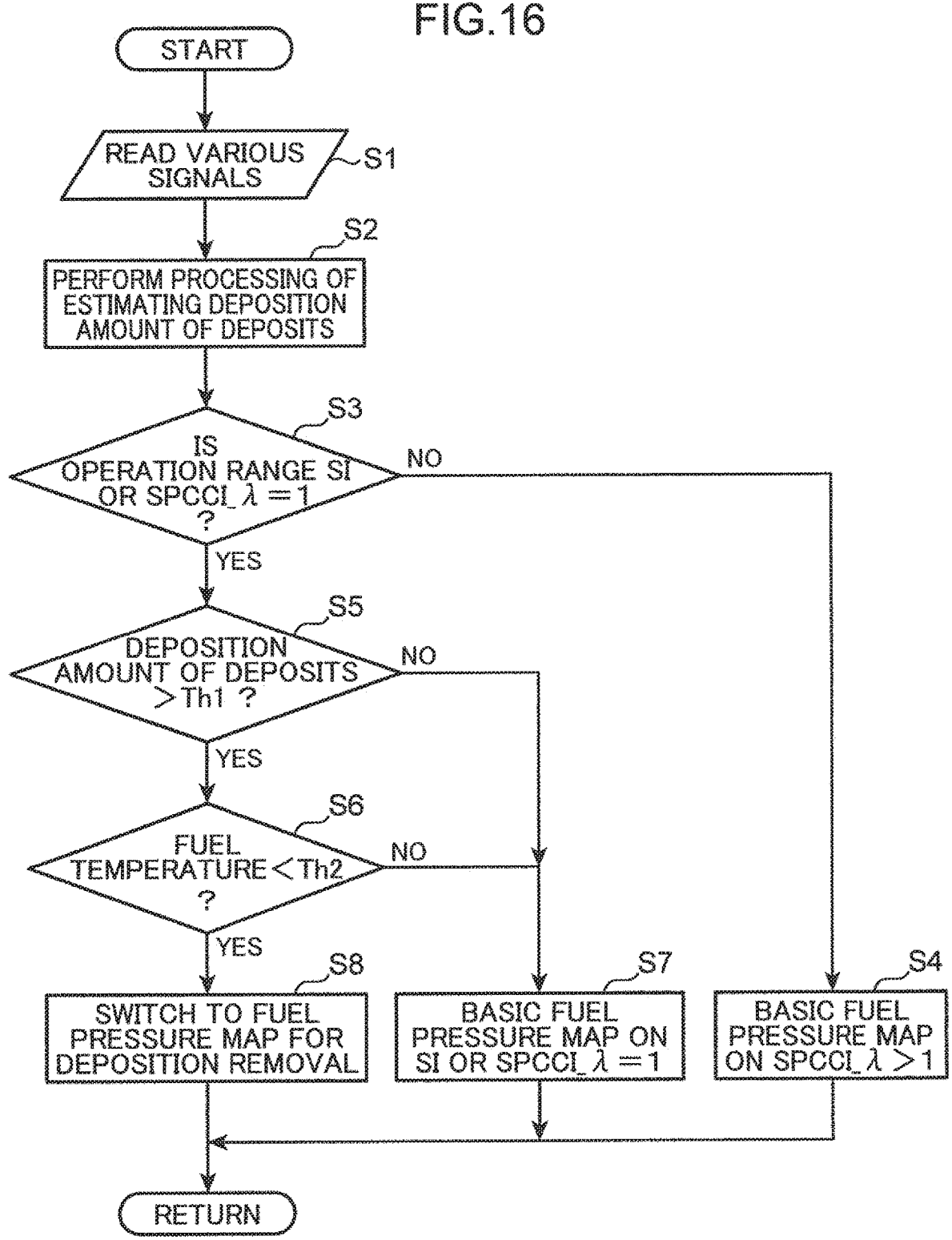
FIG. 16 is a flowchart illustrating one example of fuel pressure switching control of the injector.

FIG. 16 is a flowchart illustrating one example of fuel pressure switching control of the injector 15 by the ECU 20 (FIG. 4). The ECU 20 reads various signals from the sensors SN1 to SN11 illustrated in FIG. 4, and other sensors; and acquires information relating to an operating condition of the engine body 1 (Step S1). The ECU 20 specifies in which region of the operation maps Q1 to Q3 illustrated in FIGS. 5A to 5C, a current operation point is located, based on the acquired information.

Subsequently, the deposition estimation unit 27 acquires a unit deposition amount in a current processing cycle according to an operating condition, and performs processing of acquiring a deposition amount of deposits by integrating the unit deposition amount (Step S2). In the processing, as described above in detail, the deposition estimation unit 27 derives a unit deposition amount that is corrected according to an operating condition by applying the equation (1). Specifically, the deposition estimation unit 27 acquires the unit deposition amount by referring to the rotational load coefficient map, the fuel pressure coefficient map, and the injection amount offset coefficient map that are stored in advance in the storage unit 29 for correction, and multiplying a deposition amount per operation time that is determined by an operation time and an operating condition, by each of the coefficients in these maps.

Thereafter, the fuel pressure control unit 26 determines a current operation range (Step S3). For simplification, in this section, a case is described in which determination is made whether the operation range is a range in SI combustion (tenth region C1 in FIG. 5C), a range in SPCCI_$\lambda$=1 combustion (sixth region B1 in FIG. 5B), or a range in SPCCI_$\lambda$>1 combustion (first region A1 in FIG. 5A). When the operation range is not an operation range in which SI combustion or SPCCI_$\lambda$=1 combustion is performed (NO in Step S3), in other words, is an operation range in which SPCCI_$\lambda$>1 combustion is performed, the fuel pressure control unit 26 sets a fuel pressure of the injector 15 by referring to a basic fuel pressure map on SPCCI_$\lambda$>1 combustion illustrated in FIG. 9 (Step S4). Specifically, when SPCCI_$\lambda$>1 combustion is performed, as described above, a cleaning mode of increasing a fuel pressure is not performed, taking into consideration a drawback such that linearity of a fuel injection amount may be lowered.

On the other hand, when the operation range is an operation range in which SI combustion or SPCCI_$\lambda$=1 combustion is performed (YES in Step S3), the fuel pressure control unit 26 determines whether the deposition amount of deposits acquired by the deposition estimation unit 27 in Step S2 exceeds a predetermined threshold value Th1 (Step S5). The threshold value Th1 is set to any value before the deposition amount of deposits reaches a deposition amount of deposits at which fuel injection characteristics from the injection holes 15B are deteriorated. When the deposition amount of deposits does not exceed the threshold value Th1 (NO in Step S5), the fuel pressure control unit 26 does not perform a cleaning mode, and sets a fuel pressure of the injector 15 by referring to a basic fuel pressure map on SI combustion and SPCCI_$\lambda$=1 combustion illustrated in FIG. 8 (Step S7).

When the deposition amount of deposits exceeds the threshold value Th1 (YES in Step S5), the fuel pressure control unit 26 refers to, in a current processing cycle, a fuel temperature, which is derived by the fuel temperature derivation unit 28 from a detection value of the second intake air temperature sensor SN7 and a detection value of the water temperature sensor SN2 (Step S6). When the fuel temperature is equal to or higher than a predetermined threshold value Th2 (NO in Step S6), in other words, when the fuel temperature reaches a relatively high temperature, the fuel pressure control unit 26 does not perform a cleaning mode, and sets a fuel pressure of the injector 15 by referring to the basic fuel pressure map on SI combustion and SPCCI_$\lambda$=1 combustion (Step S7). This is because, even in a state that a deposition amount of deposits exceeds the threshold value Th1, increasing a fuel pressure when fuel is in a high temperature state may further raise the fuel temperature, and a fuel failure such as generation of bubbles may occur.

On the other hand, when the fuel temperature is lower than the threshold value Th2 (YES in Step S6), the fuel pressure control unit 26 performs a cleaning mode. Specifically, a fuel pressure map to be referred to is switched from the basic fuel pressure map to the fuel pressure map for deposition removal illustrated in FIG. 10 (Step S8). Thus, when the operation range belongs to a predetermined operation range (low to middle load range), a fuel pressure is increased, as compared with the basic fuel pressure map, and deposits on the vicinities of the injection holes 15B are removed.

[Modifications]

In the foregoing, an embodiment according to the present invention has been described. The present invention, however, is not limited to the above, and the following modified embodiments may be employed, for example.

(1) The embodiment describes an example in which, as expressed by the equation (1), a unit deposition amount is acquired by using a fuel pressure coefficient and an injection amount offset coefficient, in addition to a rotational load coefficient, which is determined by a relationship between a fuel injection timing and a distance to a TDC of the piston 5. Alternatively, it is possible to acquire a unit deposition amount by omitting either one or both of the fuel pressure coefficient and the injection amount offset coefficient.

(2) The embodiment exemplifies a configuration in which, in the fuel pressure map for deposition removal in FIG. 10, a fuel pressure is not increased in a high-speed and high-load operation range. This is merely one example. It is possible to increase a fuel pressure when a cleaning mode is performed, also in the high-speed and high-load operation range.

(3) The embodiment describes an example in which a cleaning mode is not performed when SPCCI_$\lambda$>1 combustion is performed. Alternatively, it is possible to perform a cleaning mode in which a fuel pressure is increased, after lean combustion is shifted to a fuel-rich side by temporarily changing a combustion pattern from SPCCI_$\lambda$>1 combustion to SPCCI_$\lambda$=1 combustion, for example.

(4) The embodiment describes an example in which a cleaning mode is not performed, when a fuel temperature is equal to or higher than the threshold value Th2 (Step S6 in FIG. 16). When a means (such as a cooling device) for eliminating a fuel temperature increase is provided, in other words, when a vehicle is provided with a countermeasure against a fuel temperature increase, it is possible to omit processing of determining a fuel temperature.

The above specific embodiment discloses a combustion chamber structure for an engine having the following configuration.

An engine control device according to one aspect of the present invention is a control device for an engine provided with a fuel injection valve disposed within a combustion chamber, a part of which is defined by a piston including a cavity in a crown surface thereof, and configured to directly inject fuel toward the cavity. The control device includes: a fuel pressure adjustment mechanism for adjusting a fuel pressure of fuel to be supplied to the fuel injection valve; and a controller for controlling the fuel injection valve and the fuel pressure adjustment mechanism, and constituted of a circuitry. The controller is configured to set a fuel injection timing at which fuel is injected from the fuel injection valve, based on an operating condition of the engine, output a control signal to the fuel injection valve in such a way as to drive the fuel injection valve, based on the set fuel injection timing, perform processing of integrating a deposition amount of deposits per unit time, based on an operating condition of the engine, and estimating a deposition amount of deposits on an injection hole of the fuel injection valve, output a control signal to the fuel pressure adjustment mechanism in such a way as to increase the fuel pressure, when the estimated deposition amount of deposits exceeds a predetermined value, correct the unit deposition amount acquired by estimation of the deposition amount of deposits according to the set fuel injection timing of the fuel injection valve, and correct in such a way that as compared with the unit deposition amount when the fuel injection timing is set to a first timing away from a top dead center of the piston by a first period, the unit deposition amount decreases when the fuel injection timing is set to a second timing away from the top dead center of the piston by a second period longer than the first period.

In the control device, when the fuel injection timing is set to the second timing, which is farther away from the top dead center of the piston, the controller corrects in such a way that the unit deposition amount of deposits decreases, as compared with a case when the fuel injection timing is set to the first timing. As the piston approaches the top dead center, fuel injected from the injection hole is likely to flow back from the cavity. Therefore, it can be said that, in this state, injected fuel by an amount of flowing back adheres to the vicinity of the injection hole, and deposits are likely to be deposited. On the other hand, when the piston is away from the top dead center, flowing back of injected fuel naturally decreases. Therefore, performing integration by correcting the unit deposition amount to decrease, when the fuel injection timing is set to the second timing, as compared with a case when the fuel injection timing is set to the first timing, enables to accurately acquire a deposition amount of deposits. Thus, the controller causes the fuel pressure adjustment mechanism timely increase a fuel pressure for enabling to perform a cleaning operation of deposits.

In the control device for the engine, desirably, the controller may cause the fuel injection valve to perform fuel injection in an intake stroke, and the controller may correct in such a way that the unit deposition amount decreases when the fuel injection timing is set to a retarded side of the intake stroke, as compared with the unit deposition amount when the fuel injection timing is set to an advanced side of the intake stroke.

In the intake stroke, the piston is located farther away from the top dead center when the fuel injection timing is on a retarded side, as compared with a case that the fuel injection timing is on an advanced side. In the control device, the controller corrects in such a way that the unit deposition amount decreases when the fuel injection timing is set to a retarded side, as compared with a case that the fuel injection timing is set to an advanced side. Specifically, since integration is performed by correcting the unit deposition amount to decrease, when the fuel injection timing is set to a retarded side, where flowing back of injected fuel is small, as compared with a case when the fuel injection timing is set to an advanced side, it is possible to accurately acquire a deposition amount of deposits.

In the control device for the engine, desirably, the controller may cause the fuel injection valve to perform fuel injection in a compression stroke, and the controller may correct in such a way that the unit deposition amount decreases when the fuel injection timing is set to an advanced side of the compression stroke, as compared with the unit deposition amount when the fuel injection timing is set to a retarded side of the compression stroke.

In the compression stroke, the piston is located farther away from the top dead center when the fuel injection timing is on an advanced side, as compared with a case that the fuel injection timing is on a retarded side. In the control device, the controller corrects in such a way that the unit deposition amount decreases when the fuel injection timing is set to an advanced side, as compared with a case that the fuel injection timing is set to a retarded side. Specifically, since integration is performed by correcting the unit deposition amount to decrease, when the fuel injection timing is set to an advanced side, where flowing back of injected fuel is small, as compared with a case when the fuel injection timing is set to a retarded side, it is possible to accurately acquire a deposition amount of deposits.

In the control device for the engine, desirably, the controller may set a fuel pressure of fuel to be supplied to the fuel injection valve according to an operating condition of the engine, and output a control signal to the fuel pressure adjustment mechanism in such a way that a fuel pressure coincides with the set fuel pressure. The controller may correct the unit deposition amount to a minus side, when the set fuel pressure is higher than a predetermined reference fuel pressure. Further, desirably, the controller may set a fuel injection amount to be injected from the fuel injection valve according to an operating condition of the engine, and output a control signal to the fuel injection valve in such a way that the set fuel injection amount is injected. The controller may correct the unit deposition amount to a minus side, when the set fuel injection amount is larger than a predetermined reference injection amount. In the control device having the above configurations, it is possible to accurately acquire the unit deposition amount according to an operating condition of the engine.

An engine system according to another aspect of the present invention includes: an engine body including a combustion chamber, a part of which is defined by a piston including a cavity in a crown surface thereof, and a fuel injection valve disposed within the combustion chamber and configured to directly inject fuel toward the cavity; and the above-described control device. A head portion of the fuel injection valve in which the injection hole is formed is disposed on a ceiling surface of the combustion chamber in such a way as to face the cavity in a vicinity of a radial center of the combustion chamber.

In the engine system, the fuel injection valve is of a so-called center injection type in which the fuel injection valve is vertically disposed in such a way as to face the cavity from above the combustion chamber. Since this arrangement is likely to cause flowing back of injected fuel from the cavity, performing processing of correction and integration of a unit deposition amount of deposits by the deposition estimation unit is more advantageous.

A control method for an engine according to yet another aspect of the present invention is a control method for an engine provided with a combustion chamber, a part of which is defined by a piston including a cavity in a crown surface thereof, a fuel injection valve for directly injecting fuel toward the cavity, and a fuel pressure adjustment mechanism for adjusting a fuel pressure of fuel to be supplied to the fuel injection valve. The control method includes: setting a fuel injection timing at which fuel is injected from the fuel injection valve, based on an operating condition of the engine; driving the fuel injection valve, based on the set fuel injection timing; integrating a deposition amount of deposits per unit time, based on an operating condition of the engine, and estimating a deposition amount of deposits on an injection hole of the fuel injection valve; causing the fuel pressure adjustment mechanism to increase the fuel pressure, when the estimated deposition amount of deposits exceeds a predetermined value; correcting the unit deposition amount acquired by estimation of the deposition amount of deposits according to the set fuel injection timing of the fuel injection valve; and correcting in such a way that as compared with the unit deposition amount when the fuel injection timing is set to a first timing away from a top dead center of the piston by a first period, the unit deposition amount decreases when the fuel injection timing is set to a second timing away from the top dead center of the piston by a second period longer than the first period.

The present invention described above enables to provide an engine control device and an engine control method capable of accurately predicting a deposition amount of deposits on an injection hole of a fuel injection valve, and timely cleaning deposits; and an engine system to which the engine control device and the engine control method are applied.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A control device for an engine provided with a fuel injection valve disposed within a combustion chamber, a part of which is defined by a piston including a cavity in a crown surface thereof, and configured to directly inject fuel toward the cavity, the control device comprising:
    a fuel pressure adjustment mechanism for adjusting a fuel pressure of fuel to be supplied to the fuel injection valve; and
    a controller for controlling the fuel injection valve and the fuel pressure adjustment mechanism, and constituted of a circuitry, wherein
    the controller is configured to
    set a fuel injection timing at which fuel is injected from the fuel injection valve, based on an operating condition of the engine,
    output a control signal to the fuel injection valve in such a way as to drive the fuel injection valve, based on the set fuel injection timing,
    perform processing of integrating a deposition amount of deposits per unit time, based on an operating condition of the engine, and estimating a deposition amount of deposits on an injection hole of the fuel injection valve,
    output a control signal to the fuel pressure adjustment mechanism in such a way as to increase the fuel pressure, when the estimated deposition amount of deposits exceeds a predetermined value,
    correct the unit deposition amount acquired by estimation of the deposition amount of deposits according to the set fuel injection timing of the fuel injection valve, and
    correct in such a way that as compared with the unit deposition amount when the fuel injection timing is set to a first timing away from a top dead center of the piston by a first period, the unit deposition amount decreases when the fuel injection timing is set to a second timing away from the top dead center of the piston by a second period longer than the first period.

2. The control device for the engine according to claim 1, wherein
    the controller causes the fuel injection valve to perform fuel injection in an intake stroke, and
    the controller corrects in such a way that the unit deposition amount decreases when the fuel injection timing is set to a retarded side of the intake stroke, as compared with the unit deposition amount when the fuel injection timing is set to an advanced side of the intake stroke.

3. The control device for the engine according to claim 1, wherein
    the controller causes the fuel injection valve to perform fuel injection in a compression stroke, and
    the controller corrects in such a way that the unit deposition amount decreases when the fuel injection timing is set to an advanced side of the compression stroke, as compared with the unit deposition amount when the fuel injection timing is set to a retarded side of the compression stroke.

4. The control device for the engine according to claim 1, wherein
    the controller sets a fuel pressure of fuel to be supplied to the fuel injection valve according to an operating condition of the engine, and outputs a control signal to the fuel pressure adjustment mechanism in such a way that a fuel pressure coincides with the set fuel pressure, and
    the controller corrects the unit deposition amount to a minus side, when the set fuel pressure is higher than a predetermined reference fuel pressure.

5. The control device for the engine according to claim 1, wherein
    the controller sets a fuel injection amount to be injected from the fuel injection valve according to an operating condition of the engine, and outputs a control signal to the fuel injection valve in such a way that the set fuel injection amount is injected, and
    the controller corrects the unit deposition amount to a minus side, when the set fuel injection amount is larger than a predetermined reference injection amount.

6. An engine system comprising:
    an engine body including a combustion chamber, a part of which is defined by a piston including a cavity in a crown surface thereof, and a fuel injection valve disposed within the combustion chamber and configured to directly inject fuel toward the cavity; and
    the control device according to claim 1, wherein
    a head portion of the fuel injection valve in which the injection hole is formed is disposed on a ceiling surface of the combustion chamber in such a way as to face the cavity in a vicinity of a radial center of the combustion chamber.

7. A control method for an engine provided with a combustion chamber, a part of which is defined by a piston including a cavity in a crown surface thereof, a fuel injection valve for directly injecting fuel toward the cavity, and a fuel pressure adjustment mechanism for adjusting a fuel pressure of fuel to be supplied to the fuel injection valve, the control method comprising:
    setting a fuel injection timing at which fuel is injected from the fuel injection valve, based on an operating condition of the engine;
    driving the fuel injection valve, based on the set fuel injection timing;
    integrating a deposition amount of deposits per unit time, based on an operating condition of the engine, and estimating a deposition amount of deposits on an injection hole of the fuel injection valve;

causing the fuel pressure adjustment mechanism to increase the fuel pressure, when the estimated deposition amount of deposits exceeds a predetermined value;

correcting the unit deposition amount acquired by estimation of the deposition amount of deposits according to the set fuel injection timing of the fuel injection valve; and correcting in such a way that as compared with the unit deposition amount when the fuel injection timing is set to a first timing away from a top dead center of the piston by a first period, the unit deposition amount decreases when the fuel injection timing is set to a second timing away from the top dead center of the piston by a second period longer than the first period.

* * * * *